(12) United States Patent
Hwang et al.

(10) Patent No.: US 11,541,877 B2
(45) Date of Patent: Jan. 3, 2023

(54) APPARATUS AND METHOD WITH TORQUE VECTORING CONTROL FOR VEHICLES WITH INDEPENDENT DRIVING MOTOR

(71) Applicant: Research & Business Foundation Sungkyunkwan University, Suwon-si (KR)

(72) Inventors: Sung-Ho Hwang, Seoul (KR); Hoyong Na, Cheonan-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 0 days.

(21) Appl. No.: 17/506,001

(22) Filed: Oct. 20, 2021

(65) Prior Publication Data

US 2022/0219677 A1 Jul. 14, 2022

(30) Foreign Application Priority Data

Jan. 14, 2021 (KR) .................. 10-2021-0005508

(51) Int. Cl.
*B60W 30/045* (2012.01)
*B60W 10/08* (2006.01)
*B60W 10/188* (2012.01)
*B60W 40/114* (2012.01)
*B60W 50/00* (2006.01)

(52) U.S. Cl.
CPC .......... *B60W 30/045* (2013.01); *B60W 10/08* (2013.01); *B60W 10/188* (2013.01);
(Continued)

(58) Field of Classification Search
CPC .............. B60W 10/08; B60W 10/188; B60W 2050/0026; B60W 2520/10;
(Continued)

(56) References Cited

U.S. PATENT DOCUMENTS 6,691,015 B1 * 2/2004 Levine .................. G07C 5/085
340/905
11,318,924 B1 * 5/2022 Kapoor ................ B60K 17/354
(Continued)

FOREIGN PATENT DOCUMENTS

| CN | 109278756 A | * | 1/2019 | ............ B60W 40/09 |
| EP | 3816005 A2 | * | 5/2021 | ............ B60W 10/04 |
| KR | 10-1266086 B1 | | 5/2013 | |

*Primary Examiner* — Babar Sarwar
(74) *Attorney, Agent, or Firm* — NSIP Law

(57) ABSTRACT

An apparatus with torque vectoring control of a vehicle with an independent driving motor includes: one or more processors configured to: measure driving information including a steering angle, a yaw rate, a longitudinal velocity, lateral acceleration and longitudinal acceleration of the vehicle; calculate a driving aggressiveness (DA) index representing driving aggressiveness of a driver through an exponential weighted moving average (EWMA) operation using the driving information; calculate a target yaw rate based on the driving information and the DA index; and generate a control moment based on the driving information, the DA index and the target yaw rate, wherein, for the calculating of the DA index, the one or more processor are configured to calculate the DA index to have a higher value than a case of generating only longitudinal acceleration or a case of generating only lateral acceleration, in response to the longitudinal acceleration and the lateral acceleration being generated at a same time.

14 Claims, 13 Drawing Sheets

(52) U.S. Cl.
CPC .......... *B60W 40/114* (2013.01); *B60W 50/00* (2013.01); *B60W 2050/0026* (2013.01); *B60W 2520/10* (2013.01); *B60W 2520/125* (2013.01); *B60W 2520/14* (2013.01); *B60W 2540/18* (2013.01); *B60W 2540/30* (2013.01); *B60W 2710/083* (2013.01); *B60W 2710/18* (2013.01)

(58) Field of Classification Search
CPC ....... B60W 2520/125; B60W 2520/14; B60W 2540/18; B60W 2540/30; B60W 2710/083; B60W 2710/18; B60W 30/045; B60W 40/114; B60W 50/00
See application file for complete search history.

(56) References Cited

U.S. PATENT DOCUMENTS

| | | | |
|---|---|---|---|
| 2007/0276582 A1* | 11/2007 | Coughlin .............. | B60W 50/16 |
| | | | 701/123 |
| 2014/0236414 A1* | 8/2014 | Droz ....................... | G08G 1/015 |
| | | | 701/1 |
| 2019/0094865 A1* | 3/2019 | Fletcher ................. | G01C 21/26 |
| 2019/0135279 A1* | 5/2019 | Irie ........................ | B60W 30/16 |
| 2019/0291747 A1* | 9/2019 | Chiba ................... | B60W 30/00 |
| 2019/0337451 A1* | 11/2019 | Bacchus ............... | B60Q 9/008 |
| 2020/0062296 A1* | 2/2020 | Kim ...................... | G05D 1/0061 |
| 2021/0188295 A1* | 6/2021 | Hirashima ............. | G07C 5/085 |
| 2021/0197890 A1* | 7/2021 | Kim ....................... | B62D 5/046 |
| 2021/0256782 A1* | 8/2021 | Ehlers .................. | G07C 5/0816 |
| 2022/0219754 A1* | 7/2022 | Abdelfatah ............ | B62D 7/159 |

\* cited by examiner

APPARATUS AND METHOD WITH TORQUE VECTORING CONTROL FOR VEHICLES WITH INDEPENDENT DRIVING MOTOR

CROSS-REFERENCE TO RELATED APPLICATIONS

This application claims the benefit under 35 USC § 119(a) of Korean Patent Application No. 10-2021-0005508 filed on Jan. 14, 2021, in the Korean Intellectual Property Office, the entire disclosure of which is incorporated herein by reference for all purposes.

BACKGROUND

1. Field

The following description relates to an apparatus and a method with torque vectoring control for vehicles with an independent driving motor.

2. Description of the Related Art

A situation in which the stability of the driving is not ensured according to leaning of a vehicle body and the like due to a state of a road, a heel angle of the road, and/or wheel spinning during driving of the vehicle may be inevitable and have no choice but to frequently occur.

Torque vectoring may be a vehicle control algorithm which enhances the stability of the vehicle by minimizing a yaw rate error due to a phase difference before ESC entry while the vehicle may respond well to a steering intention of a driver by increasing the driving agility of the vehicle.

Typical methods and apparatuses for controlling the torque vectoring may have may have difficulty in preserving required driving torque, and a trigger condition for controlling the torque vectoring may not be clear.

Further, in typical techniques such as smart-shift, there may be techniques of changing longitudinal vehicle characteristics according to a driver characteristic, but there may be no technique of changing lateral vehicle characteristics. In addition, there may be a case where there is a discrete change of a chassis system according to a mode input of the driver, but there is a case where there is no change in continuous characteristic, and as a result, the driver feels the difference of driving.

That is, in the typical methods and apparatuses, there may be problems that a torque vectoring on/off condition is not clear and the driver's characteristics are not continuously reflected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus with torque vectoring control of a vehicle with an independent driving motor includes: one or more processors configured to: measure driving information including a steering angle, a yaw rate, a longitudinal velocity, lateral acceleration and longitudinal acceleration of the vehicle; calculate a driving aggressiveness (DA) index representing driving aggressiveness of a driver through an exponential weighted moving average (EWMA) operation using the driving information; calculate a target yaw rate based on the driving information and the DA index; and generate a control moment based on the driving information, the DA index and the target yaw rate, wherein, for the calculating of the DA index, the one or more processor are configured to calculate the DA index to have a higher value than a case of generating only longitudinal acceleration or a case of generating only lateral acceleration, in response to the longitudinal acceleration and the lateral acceleration being generated at a same time.

The one or more processors may be configured to, for the calculating of the target yaw rate, calculate the target yaw rate based on a time constant and a yaw rate gain as variable factors based on the DA index, and for the generating of the control moment, generate the control moment based on a torque vectoring controller gain as a variable factor based on the DA index.

The yaw rate gain and the torque vectoring controller gain may be calculated using a weight table in an S form in which a weight is increased as the DA index is increased, and the time constant may be calculated using a weight table in an S form in which the weight is increased as the DA index is decreased.

The apparatus may include a virtual disturbance sensor configured to measure a disturbance generated in the vehicle over time based on the steering angle, the yaw rate, the longitudinal velocity, and the lateral acceleration of the vehicle, wherein, for the generating of the control moment, the one or more processors may be configured to generate the control moment based on the measured disturbance.

The apparatus may include a torque distributor configured to distribute braking torque and driving torque to a motor of each wheel of the vehicle based on the control moment.

For the distributing of the braking torque and the driving torque, the torque distributor may be configured to distribute the driving torque and the braking torque to a rear wheel motor, and in response to the driving torque and the braking torque exceeding maximum torque of the rear wheel motor, distribute some of the driving torque and the braking torque to a front wheel motor.

The apparatus may include a hydraulic braking device configured to generate hydraulic braking torque, wherein the torque distributor may be configured to distribute the hydraulic braking torque to the front wheel motor and the rear wheel motor corresponding to a rotational direction of the vehicle, in response to the driving torque and the braking torque distributed to the front wheel motor exceeding maximum torque of the front wheel motor.

For the calculating of the DA index, the one or more processor may be configured to apply a weight according to a vehicle velocity to each measurement value included in the driving information to convert the weight to an index signal representing driving aggressiveness, wherein the weight is applied using a weight table in an S form in which a weight is increased as the vehicle velocity is increased; using a plurality of EWMA calculators configured as time windows having different sizes, calculate an average value of an index signal to be for a predetermined time window period, and calculate an aggressiveness index by applying a higher weight to the latest data to calculate an average value; calculate a DA index for each measurement value corresponding to each measurement value by calculating an average value of the aggressiveness index; and calculate the DA index using the DA index for each measurement value.

For the calculating of the DA index, the one or more processor may be configured to apply a weight to the aggressiveness index based on the DA index calculated in a previous step to calculate the DA index for each measurement value, in response to the DA index calculated in the previous step belonging to a predetermined intermediate value, calculate the DA index for each measurement value by increasing a weight of the aggressiveness index output from an EWMA calculator having a small time window and decreasing a weight of the aggressiveness index output from an EWMA calculator having a large time window, and in response to the DA index calculated in the previous step being beyond the predetermined intermediate value, calculate the DA index for each measurement value by decreasing the weight of the aggressiveness index output from the EWMA calculator having a small time window and increasing the weight of the aggressiveness index output from the EWMA calculator having a large time window.

For the generating of the control moment, the one or more processors may be configured to determine understeering of the vehicle and whether a moment is generated based on the driving information and the target yaw rate, and generate the control moment based on whether the moment is generated.

For the determining of whether the moment is generated, the one or more processors may be configured to determine whether the moment is generated according to a predetermined determination condition based on the driving information.

In another general aspect, a processor-implemented method with torque vectoring control of a vehicle with an independent driving motor includes: measuring driving information including a steering angle, a yaw rate, a longitudinal velocity, lateral acceleration and longitudinal acceleration of the vehicle; calculating a DA index representing driving aggressiveness of a driver through an exponential weighted moving average (EWMA) operation using the driving information; calculating a target yaw rate based on the driving information and the DA index; and generating a control moment based on the driving information, the DA index and the target yaw rate, wherein the calculating of the DA index comprises calculating the DA index to have a higher value than a case of generating only longitudinal acceleration or a case of generating only lateral acceleration, in response to the longitudinal acceleration and the lateral acceleration being generated at a same time.

The calculating of the target yaw rate may include calculating the target yaw rate based on a time constant and a yaw rate gain as variable factors based on the DA index, and the generating of the control moment may include generating the control moment based on a torque vectoring controller gain as a variable factor based on the DA index.

The method may include: determining understeering of the vehicle and whether a moment is generated based on the driving information and the target yaw rate; and distributing braking torque and driving torque to a motor of each wheel of the vehicle based on the control moment, wherein the generating of the control moment may include generating the control moment based on whether the moment is generated.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with torque vectoring control includes: one or more processors configured to: determine driving information of a vehicle including a longitudinal acceleration and a lateral acceleration; determine, using an exponential weighted moving average (EWMA) operation and the driving information, a driving aggressiveness (DA) index having a value greater than a value of a DA index determined in response to either one of the longitudinal acceleration and the lateral acceleration not being determined; calculate a target yaw rate based on the driving information and the DA index; and generate a control moment based on the driving information, the DA index and the target yaw rate; and a torque distributor configured to distribute braking torque and driving torque to wheel motors of the vehicle based on the control moment.

The motion information further may include any one or any combination of any two or more of a steering angle, a yaw rate, and a longitudinal velocity of the vehicle.

Other features and aspects will be apparent from the following detailed description, the drawings, and the claims.

Figure 1:
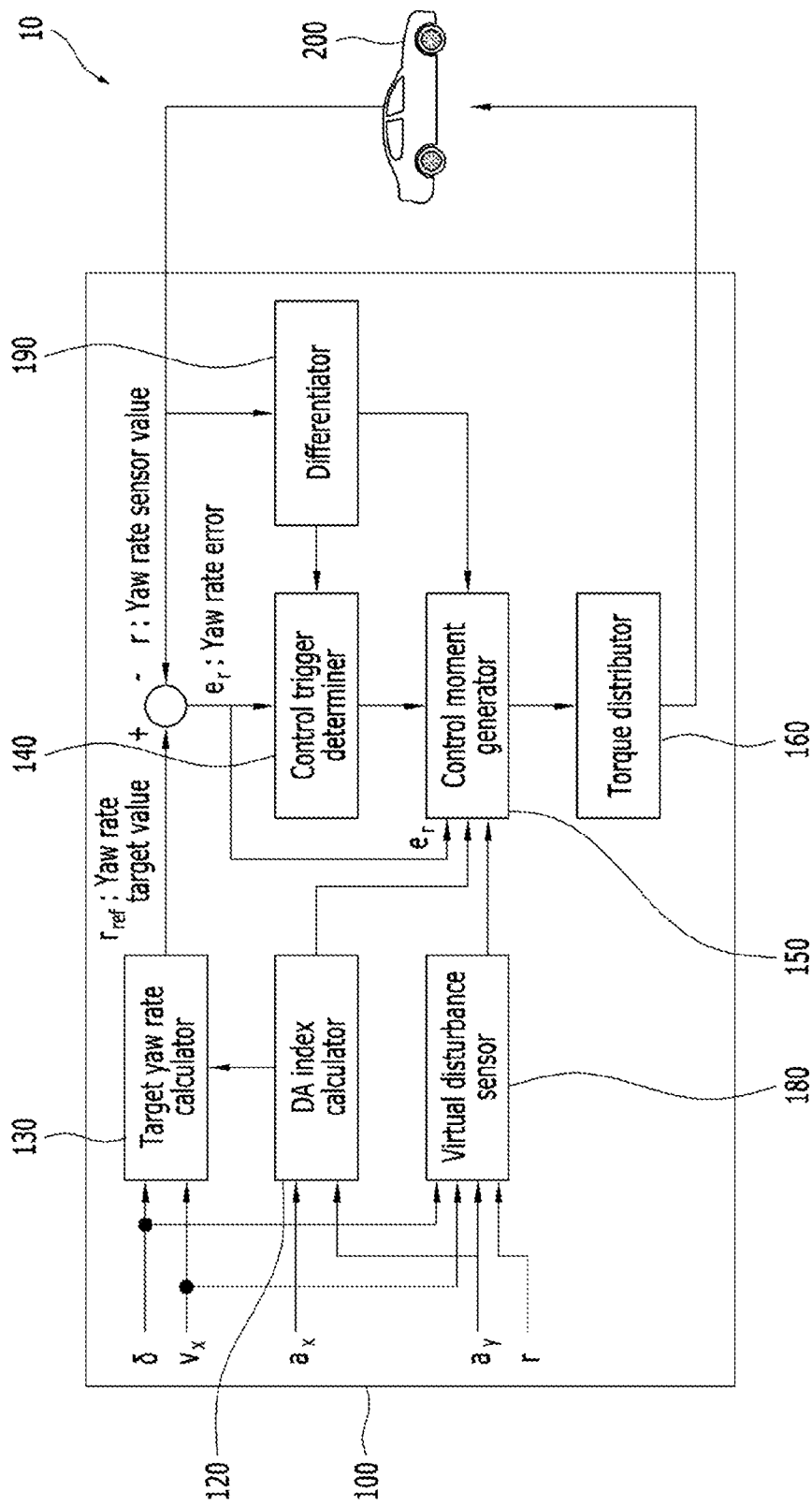
FIG. 1 is a diagram illustrating a system for controlling torque vectoring according to one or more embodiments of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for the purpose of describing particular examples only, and is not to be used to limit the disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Suffixes "module", "block", and "unit" for components used in the following description are given or mixed in consideration of easy preparation of the present specification only and do not have their own distinguished meanings or roles.

In typical techniques for torque vectoring, there are problems that it is difficult to preserve required driving torque algorithmically and a trigger condition of a torque vectoring control algorithm is not clear. In addition, in the related arts (Smart-shift, etc.), it is difficult to change lateral vehicle characteristics and there is a discrete change according to a mode input of the driver, but there is no change in continuous characteristic as disclosed in the present disclosure.

Torque vectoring may be applied to an inwheel independent driving electric vehicle. Torque vectoring may mean a vehicle control algorithm which enhances the stability of the vehicle by minimizing a yaw rate error due to a phase difference before ESC entry while the vehicle may respond well to a wheeling intention of a driver by increasing the driving agility of the vehicle.

The apparatus and the method for controlling the torque vectoring disclosed in the present disclosure may be applied to an inwheel electric vehicle, and may have a characteristic capable of generating a required moment (or control moment) by torque vectoring (or driving torque, and braking torque) while satisfying the driving torque of the driver to minimize the difference of the control. Further, by reflecting the driving characteristics of the driver to a control target value and a controller gain, torque vectoring control according to the driver's characteristics may be made.

A driving aggressiveness index (DA index) disclosed in the present disclosure may be calculated by using longitudinal acceleration and lateral acceleration. An exponentially weighted moving average (EWMA) is used and an equation may be configured to calculate a larger value when the longitudinal acceleration and the lateral acceleration occur at the same time. In addition, a time window of EWMA may be adjusted according to the scope of the value of the DA index. For example, when the DA index has a value of 0 to 100, near an intermediate value of 50, the time window of EWMA is decreased, and as the DA index is closer to 0 and 100, the time window is increased to distinguish the driving aggressiveness of the driver well.

Further, the apparatus and the method for controlling the torque vectoring disclosed in the present disclosure may be used to maximize a gain change effect according to a DA index change by minimizing gain scheduling according to a driving situation by using a model based controller other than a PID control, reduce a cognitive load of the driver, minimize ADAS intervention, and adjust the intervention time and strength (ratio) of ADAS by predicting a free running distance.

FIG. 1 is a diagram illustrating a system 10 for controlling torque vectoring according to one or more embodiments of the present disclosure.

Referring to FIG. 1, the system 10 for controlling torque vectoring according to one or more embodiments of the present disclosure may include a torque vectoring control apparatus 100 and a vehicle 200. The torque vectoring control apparatus 100 of one or more embodiments may control torque vectoring for improving understeering (US) characteristics of the vehicle 200 and improving driving emotional quality as well as enhancing the agility and stability of the vehicle 200 by reflecting driving characteristics of a driver.

Referring to FIG. 1, the system 10 for controlling torque vectoring according to one or more embodiments of the present disclosure may measure driving information from the vehicle 200 to calculate a DA index and generate a target yaw rate and a control moment to distribute torque to each motor of the vehicle 200. The system 10 for controlling torque vectoring may calculate the DA index using the driving information measured from the vehicle 200. The system 10 for controlling torque vectoring may determine understeering or whether to generate a control moment for controlling the torque vectoring. The system 10 for controlling torque vectoring may generate a target yaw rate and a control moment required for controlling the vehicle 200 using the calculated DA index and the driving information and distribute the generated control moment to each wheel of the vehicle 200 to improve the driving performance of the vehicle 200.

Referring to FIG. 1, the torque vectoring control apparatus 100 includes a measurer 110 (e.g., of FIG. 11) measuring driving information including a steering angle, a yaw rate, a longitudinal velocity, lateral acceleration and longitudinal acceleration of the vehicle 200, a DA index calculator 120 calculating a DA index representing driving aggressiveness of the driver through an exponential weighted moving average (EWMA) method using the driving information, a target yaw rate calculator 130 calculating a target yaw rate based on the driving information and the DA index, and a control moment generator 150 generating a control moment based on the driving information, the DA index and the target yaw rate. The DA index calculator 120 may calculate the DA index to have a higher value than a case of generating only longitudinal acceleration or a case of generating only lateral acceleration when the longitudinal acceleration and the lateral acceleration are generated at the same time.

The measurer 110 may measure the driving information including the steering angle, the yaw rate, the longitudinal velocity, the lateral acceleration, and the longitudinal acceleration of the vehicle 200. The driving information measured in the measurer 110 may be measured from various sensors provided in the vehicle 200. For example, sensors such as an acceleration sensor, a velocity sensor, a steering angle sensor, and an inertial sensor may be provided in the vehicle 200, and the measurer 110 may measure or receive the driving information from each sensor.

The driving information detected in the measurer 110 may include a yaw rate sensor value, an accelerator position sensor (APS) value, a longitudinal/lateral acceleration sensor value, a steering angle sensor value, a wheel velocity sensor value, an inertial measurer (IMU) sensor value, a curvature value, etc. The curvature value may be obtained by reading an image applied from a camera for capturing a progress direction of the vehicle 200, or obtained through calculation using the yaw rate sensor value and the vehicle velocity.

The DA index calculator 120 may calculate a DA index representing driving aggressiveness of the driver through an EWMA method using the driving information. The DA index represents the driving aggressiveness of the driver, and in consideration of the DA index, a target yaw rate, a control moment, and the like are generated, and the driving torque and the braking torque are distributed to each wheel of the vehicle 200, thereby assisting the control of the vehicle 200 to be suitable for the driving aggressiveness of the driver. The EWMA method is a method which is implemented with time windows having different sizes to give a low weight to old data and give an exponentially high weight to the latest data, and the detailed description for the calculation of the DA index through the EWMA method will be described below.

The target yaw rate calculator 130 may calculate a target yaw rate based on the driving information and the DA index. In order to assist the control of the vehicle 200, the target yaw rate calculator 130 may generate a control moment to distribute the torque, thereby controlling a sideslip angle component. The target yaw rate is to control a lateral motion of the vehicle 200, and may be used for calculating the control moment for controlling the sideslip angle.

The control moment generator 150 may generate a control moment based on the driving information, the DA index, and the target yaw rate. The control moment generator 150 may distribute driving torque and braking torque to each wheel of the vehicle 200 based on the control moment.

The target yaw rate and the control moment calculated in the target yaw rate calculator 130 and the control moment generator 150, respectively are generated based on the DA index. When the DA index is large, the calculated values of the target yaw rate and the control moment may be large, and on the contrary, when the DA index is low, the calculated values of the target yaw rate and the control moment may be small. That is, the values of the target yaw rate and the control moment calculated in the torque vectoring control apparatus 100 may vary according to the DA index representing the driving aggressiveness of the driver.

Referring to FIG. 1, the torque vectoring control apparatus 100 according to one or more embodiments of the present disclosure further includes a control trigger determiner 140 which determines understeering of the vehicle 200 and whether the moment is generated based on the driving information and the target yaw rate, and the control moment generator 150 may generate a control moment based on whether the moment is generated. The control trigger determiner 140 may determine the understeering of the vehicle 200 and whether the moment is generated based on the driving information and the target yaw rate. In the case of an understeering situation when the vehicle 200 is rotated, the driving torque and the braking torque are generated by the torque vectoring control to assist the lateral dynamic control of the vehicle 200. That is, the control trigger determiner 140 may perform a generation of the control moment for the torque vectoring control and determination of the on/off condition of torque distribution in the torque vectoring control apparatus 100. In other words, the control trigger determiner 140 may perform a triggering role in the torque vectoring control.

Illustratively, the control trigger determiner 140 may determine whether the control moment is generated according to a predetermined on/off condition using a change amount of the target yaw rate and a change amount of the yaw rate. The detailed on/off condition will be described below.

Referring to FIG. 1, the torque vectoring control apparatus 100 according to one or more embodiments of the present disclosure further includes a virtual disturbance sensor 180 which measures a disturbance generated in the vehicle 200 over time based on the steering angle, the yaw rate, the longitudinal velocity, and the lateral acceleration of the vehicle 200, and the control moment generator 150 may generate the control moment by considering the measured disturbance. The virtual disturbance may mean a time slowly varying disturbance capable of changing over time, and for example, may include a mass change, and the like according to the number of passengers, a weight of a product loaded on the vehicle 200, or the like. By generating the control moment in consideration of the virtual disturbance, it is possible to generate a control moment more suitable for driving of the vehicle 200. The disturbance is estimated through the virtual disturbance sensor 180 for removing the time slowly varying disturbance, and the disturbance (that is, virtual disturbance) is applied to the control moment generator 150 for controlling the torque vectoring to be stable in a cornering rigidity change and the like according to a center of gravity, a mass, and tire aging of the vehicle.

Referring to FIG. 1, the torque vectoring control apparatus 100 according to one or more embodiments of the present disclosure may further include a torque distributor 160 which distributes the braking torque and the driving torque to a motor of each wheel of the vehicle 200 based on the control moment. The torque distributor 160 may distribute torque to each wheel of the vehicle 200 according to the generated control moment.

A differentiator 190 may generate a derivative value of the measured yaw rate, etc., the control trigger determiner 140 may determine whether to generate the control moment using the derivative value of the yaw rate or the like, and the control moment generator 150 may generate the control moment.

Figure 2:
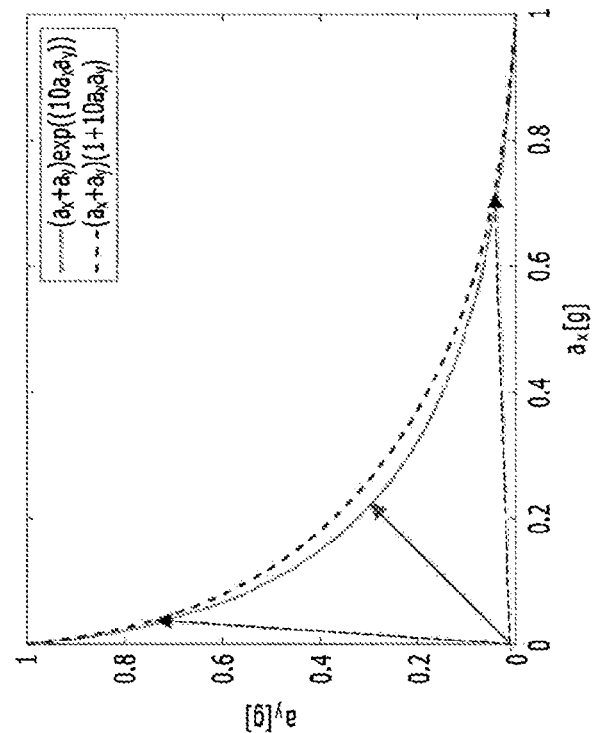
FIG. 2 is a diagram illustrating a graph of a driving aggressiveness index calculated according to longitudinal acceleration and lateral acceleration according to one or more embodiments of the present disclosure.
Figure 2:
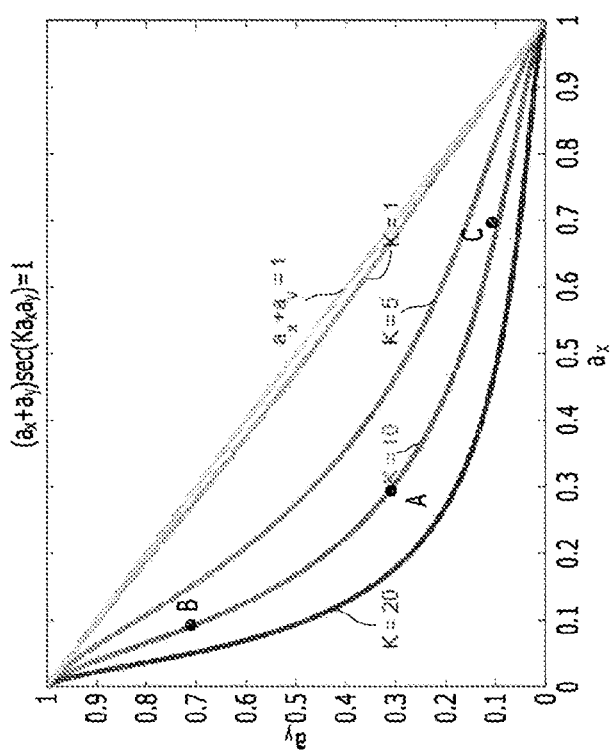

FIG. 2 is a diagram illustrating a graph of a DA index calculated according to longitudinal acceleration and lateral acceleration according to one or more embodiments of the present disclosure. In FIG. 2, a horizontal axis represents longitudinal acceleration $a_x$, and a vertical axis represents lateral acceleration $a_y$.

Referring to FIG. 2, the DA index calculator 120 of the torque vectoring control apparatus 100 according to one or more embodiments of the present disclosure may calculate the DA index to have a higher value than a case of generating only longitudinal acceleration or a case of generating only lateral acceleration when the longitudinal acceleration and the lateral acceleration occur at the same time.

A left graph of FIG. 2 shows a DA index according to a tuning parameter K. The left graph of FIG. 2 shows values of the longitudinal acceleration and the lateral acceleration with the same DA index value according to the tuning parameter K, respectively. When the tuning parameter K is 10, for example, it may be confirmed that a value of the DA index when the longitudinal acceleration and the lateral acceleration are about 0.3, respectively (A) is the same as a value of the DA index when the lateral acceleration is about 0.1 and the longitudinal acceleration is about 0.7 (B) or when the longitudinal acceleration is about 0.1 and the lateral acceleration is about 0.7 (C).

At this time, when the longitudinal acceleration and the lateral acceleration are about 0.3, respectively, the values of the longitudinal acceleration and the lateral acceleration are about 0.6, and when the longitudinal acceleration is about 0.1 and the lateral acceleration is about 0.7 or when the lateral acceleration is about 0.1 and the longitudinal acceleration is about 0.7, the sum of the longitudinal acceleration and the lateral acceleration is about 0.8, respectively. That is, when the longitudinal acceleration and the lateral acceleration are about 0.3, respectively, it may be seen that the size of the sum of the longitudinal acceleration and the lateral acceleration is small, but the same DA index value is calculated. When the longitudinal acceleration and the lateral acceleration are generated at the same time, it may be seen that the DA index value is calculated to have a higher value than a case of generating only the longitudinal acceleration and a case of generating only the lateral acceleration.

In other words, when the longitudinal acceleration and the lateral acceleration are about 0.3, respectively, the value of the DA index is higher than that of the case of generating only the longitudinal acceleration (for example, the longitudinal acceleration is 0.5 and the lateral acceleration is 0.1) or the case of generating only the lateral acceleration (for example, the longitudinal acceleration is 0.1 and the lateral acceleration is 0.5).

When the lateral acceleration and the longitudinal acceleration are generated at the same time, the DA index is calculated to have a higher than the case of generating only the longitudinal acceleration or the case of generating only the lateral acceleration may be expressed as the following Equation 1.

$$C(\text{DA index}) = (|a_x| + |a_y|)\sec(K(|a_x|)|a_y|) \quad \text{Equation 1:}$$

In Equation 1, $a_x$ means longitudinal acceleration, $a_y$ means lateral acceleration, and DA index means a DA index.

In order to simplify an operation in Equation 1, the following Equation 2 similar to Equation 1 may be derived. Referring to the following Equation 2, as described above, when the tuning parameter K is 10, it may be seen that when the longitudinal acceleration is 0.3 and the lateral acceleration is 0.3, the DA index is calculated to be higher than that of when the longitudinal acceleration is 0.1 and the lateral acceleration is 0.5 in which the sum of the acceleration size of each direction is the same or when the longitudinal acceleration is 0.1 and the lateral acceleration is 0.5.

$$C(\text{DA index}) = (|a_x| + |a_y|)(1 + K(|a_x|)|a_y|) \quad \text{Equation 2:}$$

In Equation 2, $a_x$ means longitudinal acceleration, $a_y$ means lateral acceleration, DA Index means a DA index, and K means a tuning parameter.

In a right graph of FIG. 2, a curve having the same DA index when the value of the tuning parameter K' is 10 according to Equation 2 is represented as a solid line and a curve having the same DA index when the value of the tuning parameter K' is 10 according to Equation 1 is represented as a dotted line. That is, Equation 1 is simplified to Equation 2 to simplify the operation, and even according to Equation 2 to simplify the operation, a result similar to Equation 1 may be obtained.

That is, the DA index may be calculated to have a high value when the longitudinal acceleration and the lateral acceleration are generated at the same time to design an Equation and the Equation may be calculated to simplify the operation for rapidly calculating the DA index.

Hereinafter, $C_f$ means a cornering stiffness on front wheel, $C_r$ means a cornering stiffness on rear wheel, m means a mass of the vehicle 200, $v_x$ means a longitudinal velocity of the vehicle 200, $l_f$ means a distance from a mass center to a front wheel of the vehicle 200, $l_r$ means a distance from a mass center to a rear wheel, $\dot{\beta}$ means a derivative value of a sideslip angle, and $\dot{r}$ means a derivative value of a yaw rate. In addition, $I_x$ means the vehicle 200 moment of inertia around vertical axis, r means a yaw rate, $\beta$ means a sideslip angle, $\delta_f$ means a real steering angle of a front tire, $r_{ss}$ means a reference yaw rate, $k_{fv}$ means a yaw rate gain, $T_{tv}$ means a time constant, s means a complex variable in Laplace transform, $r_{ref}$ means a target yaw rate, $M_{DB}$ means a control moment, $a_y$ means lateral acceleration, $\delta$ means a steering angle, $\dot{r}_{ref}$ means a derivative value of a target yaw rate, K means a torque vectoring controller gain, and $\hat{w}$ means an estimated disturbance. The estimated disturbance $\hat{w}$ may be understood the same as a disturbance measured in the virtual disturbance sensor.

The torque vectoring control of the vehicle 200 may be performed by controlling the sideslip angle component. With respect to the sideslip angle and the yaw rate associated with the longitudinal characteristic of the vehicle 200, the vehicle 200 may be modeled as the following Equation 3. The sideslip angle calculated using Equation 3 is controlled to assist the driving the vehicle 200, and in order to control the sideslip angle, a reference yaw rate, a target yaw rate, and a control moment may be generated to distribute the torque to each wheel of the vehicle 200.

$$\begin{pmatrix} \dot{\beta} \\ \dot{r} \end{pmatrix} = \begin{pmatrix} -\frac{C_f + C_r}{mv_x} & -1 - \frac{l_f C_f - l_r C_r}{mv_x^2} \\ -\frac{l_f C_f - l_r C_r}{I_z} & -\frac{l_f^2 C_f + l_r^2 C_r}{I_z v_x} \end{pmatrix} \begin{pmatrix} \beta \\ r \end{pmatrix} \begin{pmatrix} \frac{C_f}{mv_x} \\ \frac{l_f C_f}{I_z} \end{pmatrix} \delta_f \quad \text{Equation 3}$$

Figure 3:
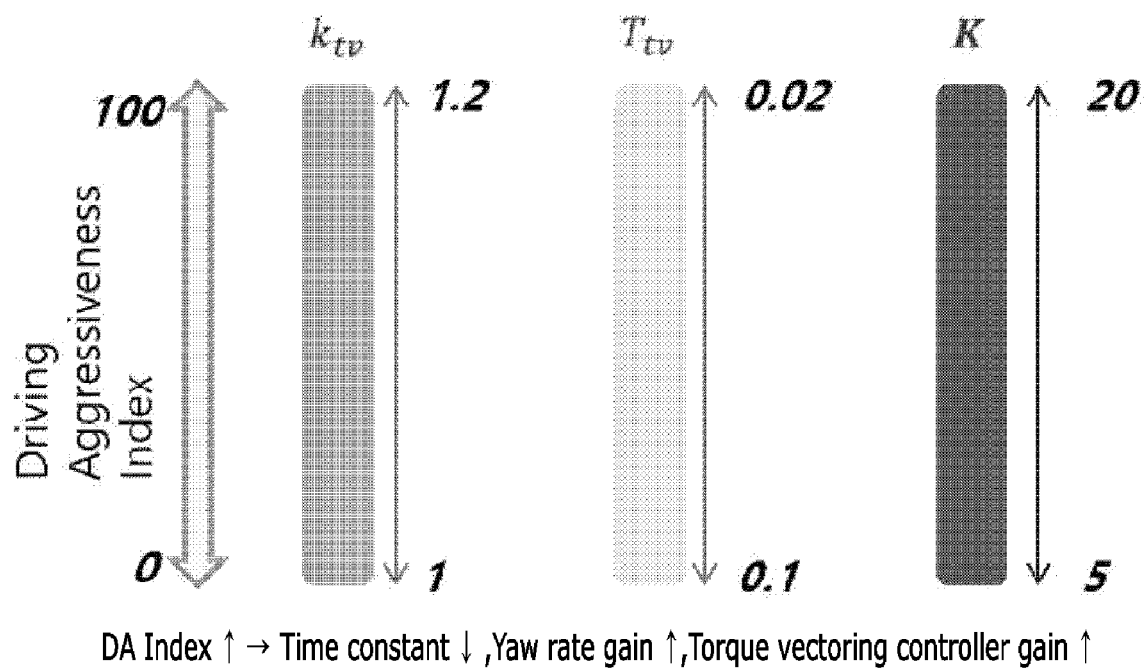
FIG. 3 is a diagram illustrating a correlation between a driving aggressiveness index and a time constant, a yaw rate gain, and a torque vectoring controller gain as variable factors according to one or more embodiments of the present disclosure.

FIG. 3 is a diagram illustrating a correlation between a DA index and a time constant, a yaw rate gain, and a torque vectoring controller gain as variable factors according to one or more embodiments of the present disclosure.

Referring to FIG. 3, the target yaw rate calculator 130 of the torque vectoring control apparatus 100 according to one or more embodiments of the present disclosure may calculate a target yaw rate based on a time constant and a yaw rate gain as variable factors based on the DA index, and the control moment generator 150 may generate a control moment based on a torque vectoring controller gain as a variable factor based on the DA index.

Referring to FIG. 3, when the DA index is increased, the time constant is decreased and the yaw rate gain and the torque vectoring controller gain are increased, and when the DA index is decreased, the time constant is increased and the yaw rate gain and the torque vectoring controller gain may be decreased. The values of the time constant, the yaw rate gain, and the torque vectoring controller gain illustrated in FIG. 3 are illustrative, and as described below, the time constant, the yaw rate gain, and the torque vectoring controller gain may be changed based on the DA index according to a weight table.

Referring to FIG. 3, it may be confirmed that the DA index may have a value of 0 to 100, and the yaw rate gain $k_{tv}$ may have a value of 1 to 1.2, the time constant $T_{tv}$ may have a value of 0.1 to 0.02, and the torque vectoring controller gain K may have a value of 5 to 20. That is, when the DA index increases from 0 to 100, it may be confirmed that the yaw rate gain increases from 1 to 1.2, the time constant decreases from 0.1 to 0.02, and the torque vectoring controller gain increases from 5 to 20.

However, the values of the DA index, the yaw rate gain, the time constant, and the torque vectoring controller gain illustrated in FIG. 3 are illustrative, and may have the range of different values according to a setting, respectively. For example, the range may be variously set to values such as the DA index of 0 to 1, the yaw rate gain of 1 to 10, the time constant of 2 to 1, and the torque vectoring controller gain of 1 to 100.

The target yaw rate may be calculated in the target yaw rate calculator 130 using the following Equation 4. Referring to the following Equation 4, as the variable factors, the value of the target yaw rate may vary by the time constant and the yaw rate gain, the values of the time constant and the yaw rate gain may vary by the DA index as confirmed in FIG. 3, and as a result, the value of the target yaw rate may vary according to the DA index. For example, in the case of the same reference yaw rate value, when the value of the DA index is low, the value of the time constant is increased and the yaw rate gain is decreased to calculate a low target yaw rate. On the contrary, when the value of the DA index is high, the value of the time constant is decreased and the yaw rate gain is increased to calculate a high target yaw rate.

$$r_{ss} = \frac{1}{1 + \frac{l_r C_r - l_f C_f}{L^2 C_f C_r} mv_x^2} \frac{v_x}{L} \delta_f \quad \text{Equation 4}$$

$$r_{ref} = \frac{k_{tv}}{T_{tv}s + 1} r_{ss}$$

The control moment may be calculated in the control moment generator 150 by the following Equation 5. Referring to the following Equation 5, the value of the control moment may vary by the torque vectoring controller gain, and the value of the target yaw rate is affected by the DA index. Similarly, even if the values of other variables are the same, when the DA index is high, the value of the torque vectoring controller gain is increased to calculate a high control moment, and when the DA index is low, the value of the torque vectoring controller gain is decreased to calculate a low control moment.

$$M_{DB} = -I_z \left( \frac{-C_f C_r}{C_f + C_r} \frac{(l_f + l_r)^2}{I_z v_x} r + \frac{(l_f C_f - l_r C_r)}{(C_f + C_r)I_z} ma_y + \frac{C_f C_r}{C_f + C_r} \frac{l_f + l_r}{I_z} \delta_f - \dot{r}_{ref} + K(r - r_{ref}) \right) + \hat{w} \quad \text{Equation 5}$$

That is, when combining the contents of Equations 4 and 5, the values of the target yaw rate and the control moment may vary by the time constant, the yaw rate gain, and the torque vectoring controller gain which are the variable factors based on the DA index, and as a result, it may be understood the same as that the values of the target yaw rate and the control moment vary according to the DA index.

Figure 4A:
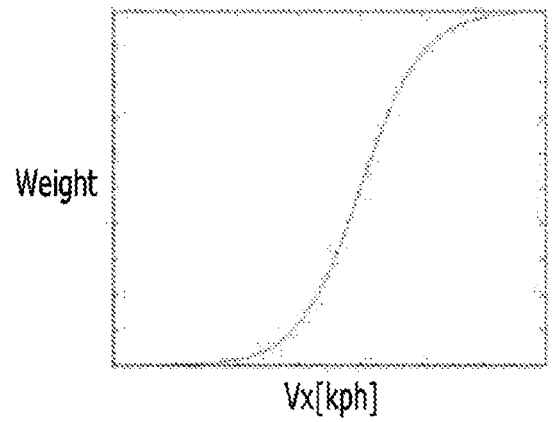
FIGS. 4A and 4B are diagrams illustrating a weight graph (table) according to one or more embodiments of the present disclosure.
Figure 4B:
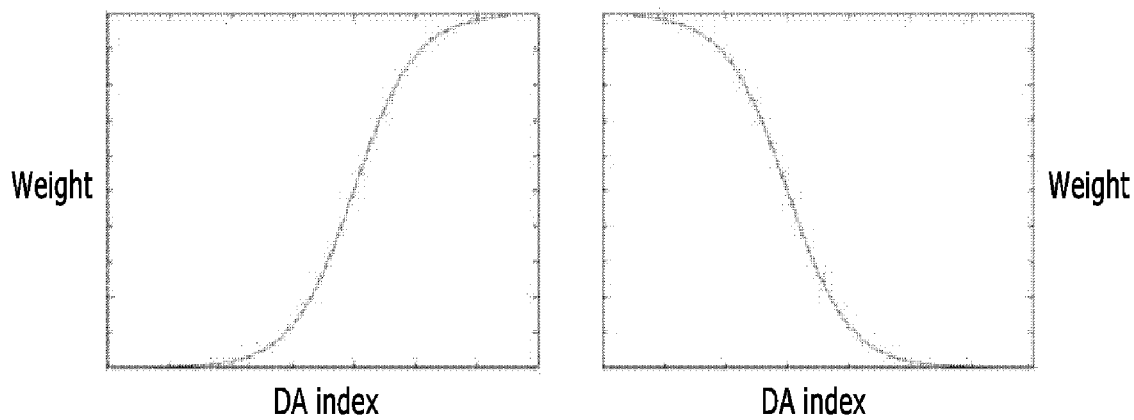

FIGS. 4A and 4B are diagrams illustrating a weight graph (table) according to one or more embodiments of the present disclosure.

Referring to FIGS. 4A and 4B, the yaw rate gain and the torque vectoring controller gain according to one or more embodiments of the present disclosure are calculated with reference to a weight table in which the weight is increased as the DA index is increased, and the time constant may be calculated with reference to a weight table in an S form in which the weight is increased as the DA index is decreased.

FIG. 4A is a diagram for describing a weight for each item included in driving information according to a longitudinal velocity of the vehicle 200 in the index calculator 121 of the DA index calculator 120 to be described below. The index calculator 121 may calculate each measurement item included in the driving information to be measured in the measurer 110 as an index signal, and at this time, may calculate each measurement item as the index signal by varying a weight according to the longitudinal velocity of the vehicle 200. At this time, referring to FIG. 4A, a weight may be applied with reference to a weight table in an S form in which the weight is increased as the vehicle velocity is increased, which may mean that the weight is rapidly changed in an intermediate region of the longitudinal velocity. A point where the weight is rapidly changed may be set so that an appropriate weight may be applied.

In FIG. 4B, a left graph shows a weight table in an S form in which the weight is increased as the DA index is increased, and a right graph shows a weight table in an S form in which the weight is increased as the DA index is decreased.

As described in FIG. 3, the values of the yaw rate gain and the torque vectoring controller gain may be increased as the DA index is increased. At this time, the yaw rate gain and the torque vectoring controller gain may also be set to be linearly increased as the DA index is increased, but as shown in a left graph of FIG. 4B, the yaw rate gain and the torque vectoring controller gain may be calculated with reference to a weight table in an S form in which the weight is increased as the DA index is increased. That is, the yaw rate gain and the torque vectoring controller gain may be set with reference to a weight table so as to be rapidly increased in the intermediate region of the DA index when the DA index increases from 0 to 100. In other words, when the DA index changes near an intermediate value, the yaw rate gain and the torque vectoring controller gain may be calculated with reference to the weight table in the S form so as to be rapidly changed.

On the contrary, as described in FIG. 3, the time constant is decreased as the DA index is increased, and the time constant may be calculated with reference to the weight table in the S form in which the weight is increased so as to be rapidly increased as the DA index is decreased. Like the yaw rate gain and the torque vectoring controller gain, the time constant is rapidly changed when the DA index is rapidly changed in the intermediate region, but when the DA index is increased, the time constant may be decreased, and when the DA index is decreased, the time constant may be increased.

Figure 5:
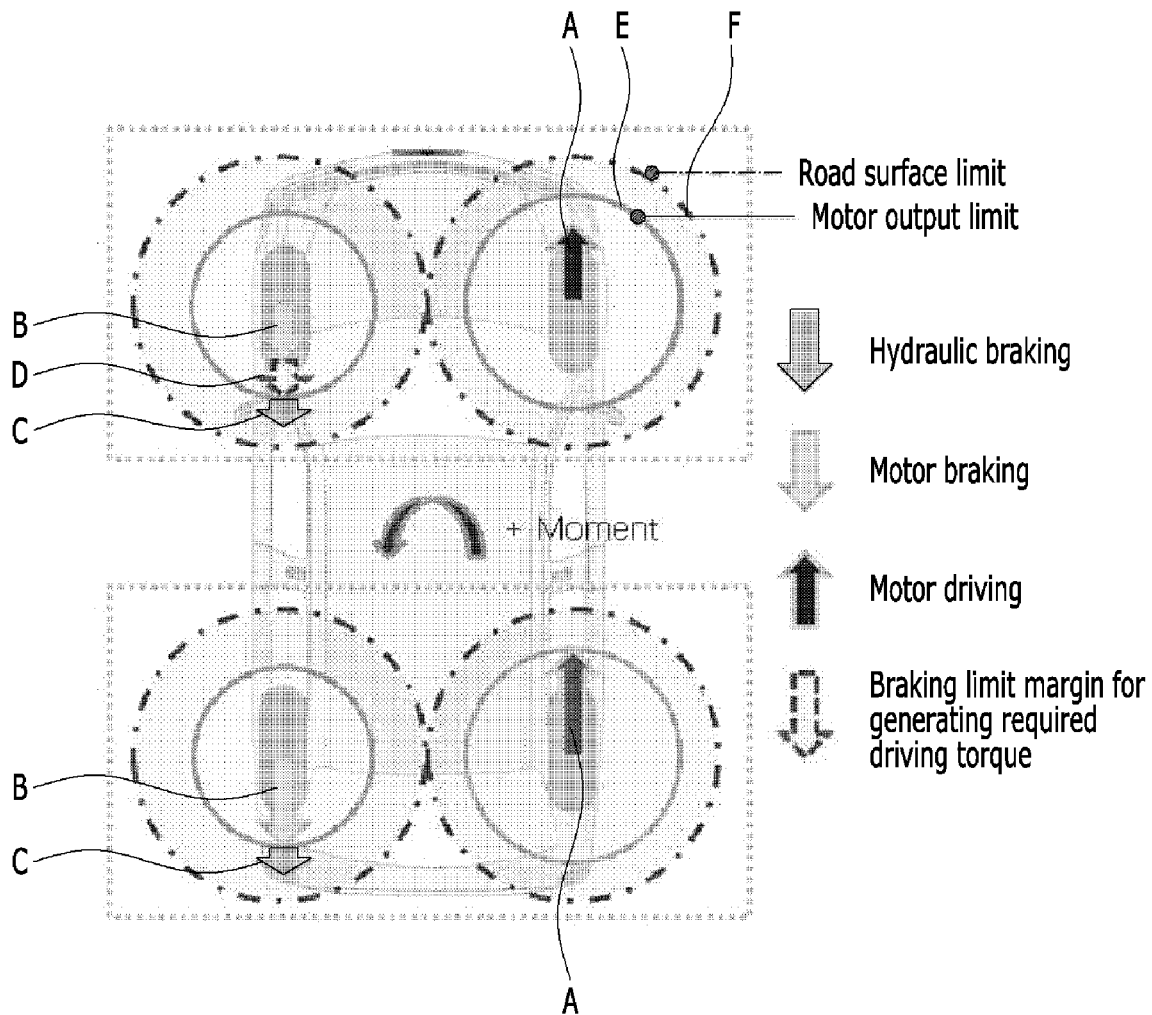
FIGS. 5 to 7 are diagrams illustrating distribution of driving torque, braking torque, and hydraulic braking torque according to one or more embodiments of the present disclosure.
Figure 6:
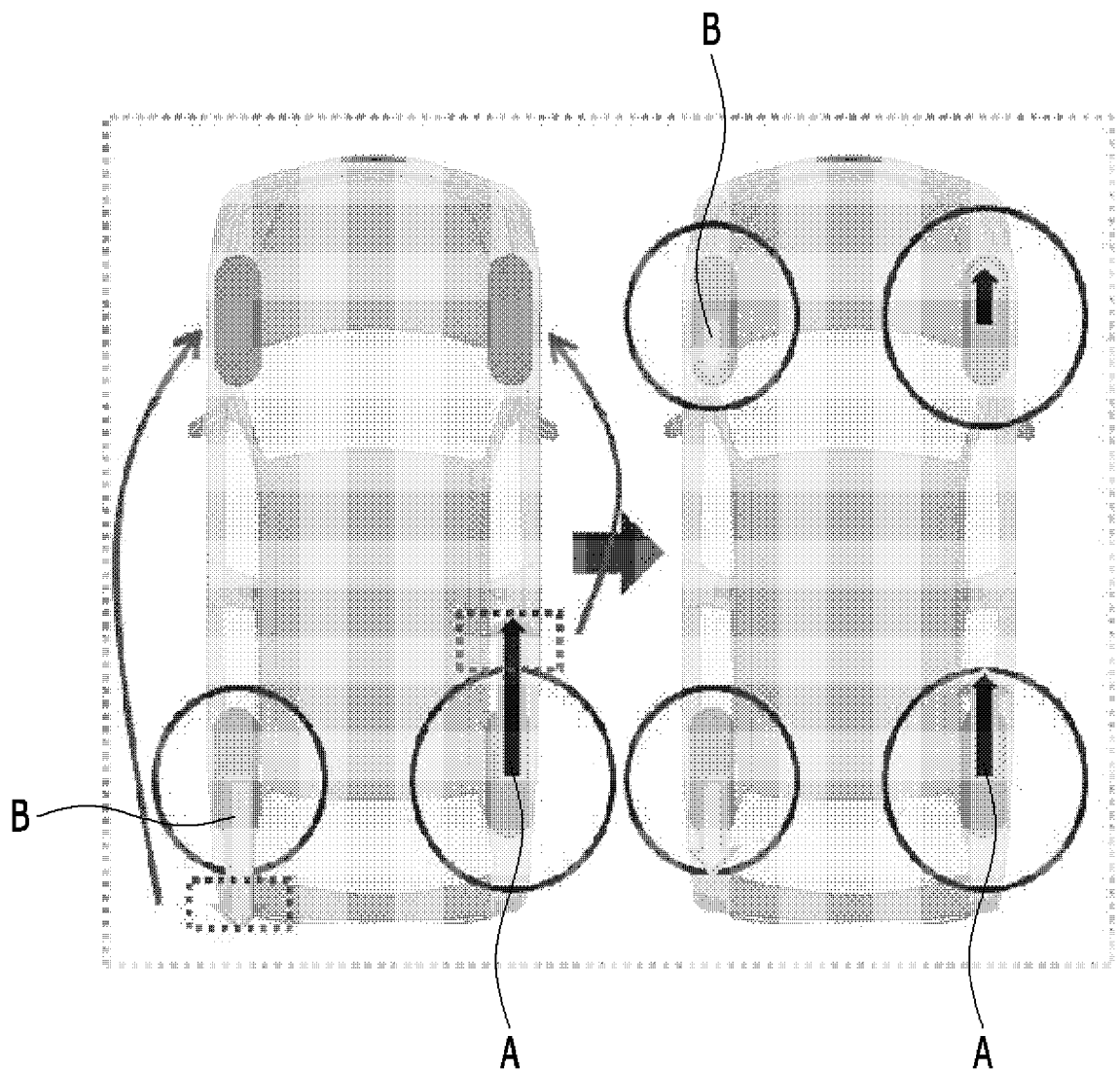
Figure 7:
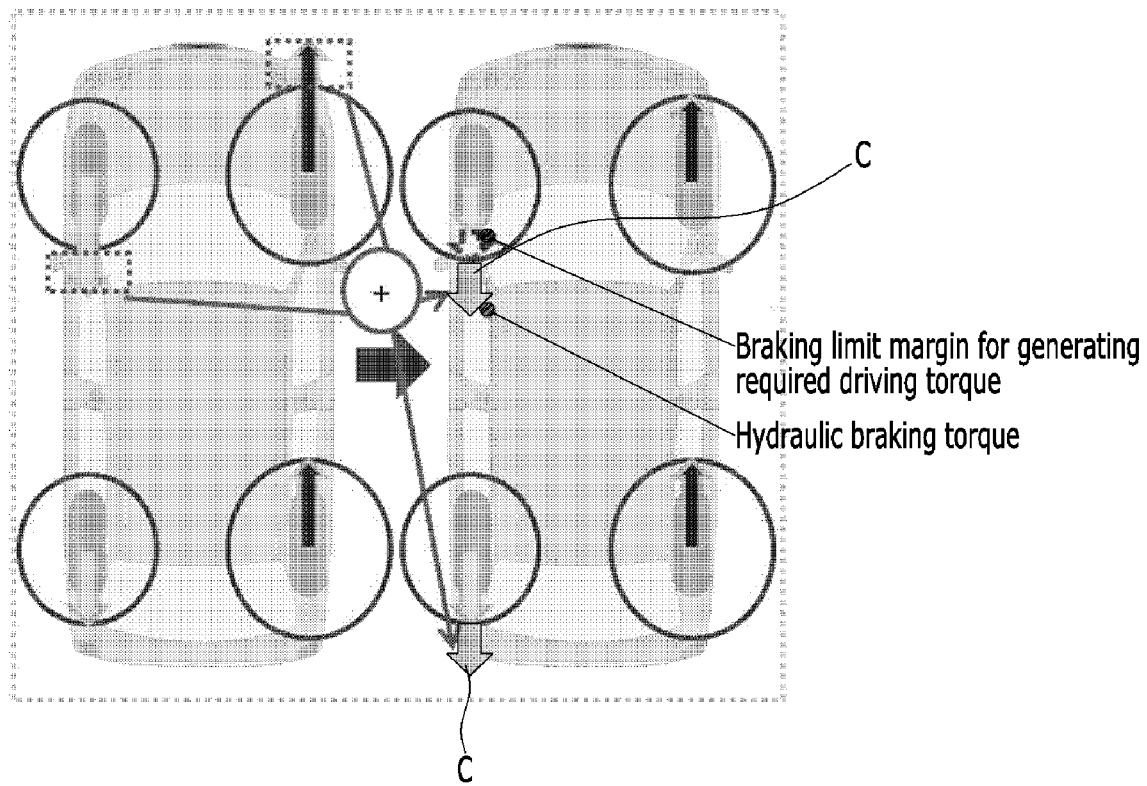

FIGS. 5 to 7 are diagrams illustrating distribution of driving torque, braking torque, and hydraulic braking torque according to one or more embodiments of the present disclosure. In FIGS. 5 to 7, driving torque (or motor driving) distributed to a front wheel motor or a rear wheel motor by the torque distributor 160 is shown as A (blue arrow), braking torque (or motor braking) is shown as B (yellow arrow), hydraulic braking torque (or hydraulic braking) is shown as C (orange arrow), a braking limit margin for generating required driving torque is shown as D (red dotted arrow), a motor output limit (or maximum torque) is shown as E (solid circle), and a road surface limit is shown as F (alternated long and short dash line circle). The driving torque and the braking torque described above mean torque which may be generated by an independent driving motor mounted on the vehicle and the hydraulic braking torque means torque which may be generated by a hydraulic braking device.

Referring to FIG. 5, the torque distributor 160 may distribute the driving torque, the braking torque, and the hydraulic braking torque to each wheel so as to correspond to a wheeling direction based on the control moment, that is, distribute the braking torque and the hydraulic braking torque to left front and rear wheels and the driving torque to right front and rear wheels. That is, in order to generate the required motor driving torque, the braking torque is not used by the required motor driving torque from the motor limit torque.

Referring to FIG. 6, the torque distributor 160 of the torque vectoring control apparatus 100 according to one or more embodiments of the present disclosure may distribute the driving torque and the braking torque to a rear wheel motor, but may distribute some of the driving torque and the braking torque to a front wheel motor when the driving torque and the braking torque exceed maximum torque of the rear wheel motor. In a left drawing of FIG. 6, in order to satisfy the generated control moment, when driving torque and braking torque required for a rear right wheel and a rear left wheel exceed a motor output limit, as illustrated in a right drawing of FIG. 6, driving torque equal to a size of the exceeding driving torque may be distributed to a front right wheel and braking torque equal to a size of the exceeding braking torque may be distributed to a front left wheel to distribute the driving torque and the braking torque so as to satisfy a required control moment.

Further, referring to FIG. 7, the torque vectoring control apparatus 100 according to one or more embodiments of the present disclosure further includes a hydraulic braking device 170 generating hydraulic braking torque, and the torque distributor 160 may distribute the hydraulic braking torque to a front wheel motor and a rear wheel motor corresponding to a rotational direction of the vehicle 200 when the driving torque and braking torque distributed to the front wheel motor exceed the maximum torque of the front wheel motor. Like FIG. 6 described above, in order to satisfy the control moment, the driving torque and the braking torque distributed to the front wheel motor may exceed a motor output limit. At this time, in FIG. 7, by summing a size of the driving torque exceeding the motor output limit in the front right wheel and a size of the braking torque exceeding the motor output limit in the front left wheel, a required control moment may be satisfied by distributing the hydraulic braking torque to each of the front left wheel and the rear left wheel. At this time, the hydraulic braking torque distributed according to an aspect of the one or more embodiments may be distributed based on a normal force.

Figure 8:
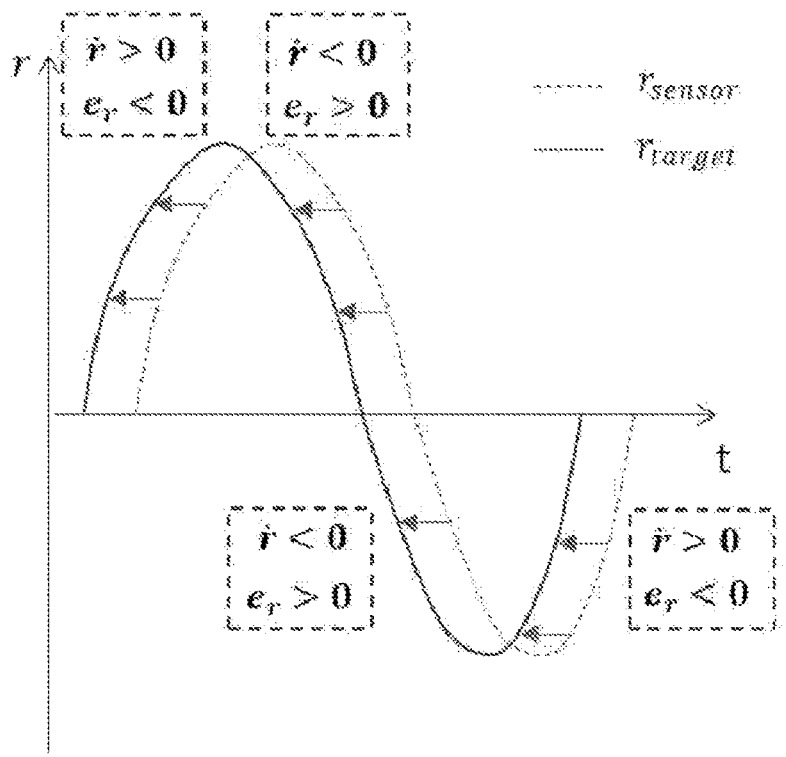
FIG. 8 is a diagram illustrating an on/off condition of an apparatus for controlling torque vectoring according to one or more embodiments of the present disclosure.

FIG. 8 is a diagram illustrating an on/off condition of the torque vectoring control apparatus 100 according to one or more embodiments of the present disclosure.

Referring to FIG. 8, the control trigger determiner 140 of the torque vectoring control apparatus 100 according to one or more embodiments of the present disclosure may determine whether the moment is generated according to a predetermined determination condition based on driving information. On/off conditions (or trigger conditions) described in FIG. 8 and the following Equation 6 are illustrative, and the on/off conditions may also be set by considering a DA index.

According to FIG. 8 and the following Equation 6, the on/off conditions for generating the control moment may be set. The control trigger determiner 140 may determine the on/off conditions using a yaw rate, a target yaw rate, and each change amount based on the driving information. At this time, $k_1$, $k_2$, $k_3$, and $k_4$ may be any constant for properly setting the on/off conditions, and may be changed by a user. Referring to the following Equation 6, it is possible to determine whether the on/off conditions are according to a yaw rate change amount, a difference between a yaw rate and a target yaw rate, and a size of the yaw rate change amount.

$$\text{On condition: sign}\left(\frac{1}{Ts+1}r_{sensor}\right)e_r < -k_1 \text{ deg/s \&\&}$$

$$\frac{1}{Ts+1}|\dot{r}_{sensor}| > k_2 \text{ deg/s}^2$$

$$\text{Off condition: sign}\left(\frac{1}{Ts+1}r_{sensor}\right)e_r > -k_3 \text{ deg/s \&\&}$$

$$\frac{1}{Ts+1}|\dot{r}_{sensor}| < k_4 \text{ deg/s}^2$$

Equation 6

In FIG. 8 and Equation 6, T may refer to a time constant of a low pass filter (LPF), S may refer to a complex variable in Laplace transform, $r_{sensor}$ may refer to a yaw rate (or a yaw rate measurement value and a yaw rate sensor value), $r_{target}$ may refer to a target yaw rate, $\dot{r}_{sensor}$ may refer to a yaw rate change amount (or derivative value of yaw rate), and $e_r = r_{sensor} - r_{target}$. In Equation 6, $1/(Ts+1)$ may be understood the same as a primary low pass filter (or low-frequency filter). When the yaw rate (or the yaw rate sensor value) is differentiated, since noise is mixed with the yaw rate change amount, the noise is appropriately filtered using a primary low pass filter. That is, the noise of the yaw rate change amount may be removed using the primary low-pass filter, and on condition/off condition (that is, on/off conditions) may be represented as Equation 6 using the sign and size of the yaw rate change amount in which noise removed.

The on/off conditions shown in Equation 6 are illustrative and the on/off conditions may be set in consideration of the DA index as described above. For example, the on/off conditions may be set in consideration of the DA index by a method of multiplying a weight according to a DA index to any constants $k_1$, $k_2$, $k_3$, and $k_4$ suitable for setting the on/off conditions or a method of multiplying a weight according to a DA index to a derivative value of the yaw rate.

The DA index calculator 120 of the torque vectoring control apparatus 100 according to the one or more embodiments of the present disclosure may include an index calculator 121 which applies a weight according to a vehicle velocity to each measurement value included in the driving information to convert the weight to an index signal representing driving aggressiveness, wherein the weight is applied with reference to a weight table in an S form in which the weight is increased as the vehicle velocity is increased, a plurality of EWMA calculators 122 which are configured as time windows having different sizes and calculate an average value of an index signal to be applied in the index calculator 121 for a predetermined time window period, but calculates an aggressiveness index by applying a higher weight to the latest data to calculate an average value, a weight-based DA index calculator 123 which calculates a DA index for each measurement value corresponding to each measurement value by calculating an average value of the aggressiveness index, and a final DA index calculator 124 which calculates a DA index using the DA index for each measurement value.

The DA index calculator 120 detects the driving aggressiveness index by applying a weight to various driving information detected (measured, or sensed) in the measurer 110, but detects the driving aggressiveness index through an EWMA method of calculating an average value by applying a lower weight to old data and applying a higher weight to the latest data, and may apply the detected driving aggressiveness index, that is, the DA index to the target yaw rate calculator 130, the control moment generator 150, and the like. Further, the DA index is applied to the control trigger determiner 140 to determine on/off trigger conditions based on the user's driving aggressiveness index, that is, the DA index.

The DA index calculator 120 may include an index calculator 121, a plurality of EWMA calculators 122, a weight-based DA index calculator 123, and a final DA index calculator 124. The DA index calculator 120 may calculate a DA index by applying a weight to the driving information detected in the measurer 110 and calculate a DA index for the user's driving aggressiveness by applying the DA index calculated for an item included in the driving information to the final DA index calculator 124.

The DA index calculator 120 may calculate a DA index through an EWMA method of applying a low weight to old data and exponentially applying a higher weight to the latest data.

Further, the DA index calculator 120 may calculate a higher DA index than the case of generating only longitudinal acceleration or the case of generating only lateral acceleration when the longitudinal acceleration and the lateral acceleration are generated at the same time. Since the detailed calculation method is described above, before the DA index is calculated by considering the longitudinal acceleration and the lateral acceleration, a process of calculating the DA index from each of the driving information will be described.

The DA index calculator 120 may convert the driving aggressiveness as an index signal in response to each of the driving information detected in the measurer 110, calculate an aggressiveness index by applying different time windows and weights to the index signal, and calculate a DA index for each measurement value by calculating an average value of the aggressiveness index. The DA index may be calculated using the DA index for each measurement value.

For example, the measurer 110 detects a yaw rate sensor value, an accelerator position sensor value, a longitudinal/lateral acceleration sensor value, a steering angle sensor value, a wheel velocity sensor value, an IMU sensor value, and a curvature value, the DA index calculator 120 may calculate a DA index for each measurement value in response to each of the driving information and calculate a DA index using the calculated DA index for each measurement value.

The DA index calculator 120 may include an index calculator 121, an EWMA calculator 122, a weight-based DA index calculator 123, and a final DA index calculator 124.

The index calculator 121 may process each input value input from the measurer 110 to convert the input value to an index signal representing driving aggressiveness. That is, each input value input from the measurer 110 may be applied with a weight according to a vehicle velocity to be converted to an index signal representing the driving aggressiveness.

For example, the index calculator 121 receiving the yaw rate value (or the yaw rate sensor value) may differentiate the yaw rate value received from the measurer 110 and then applies the weight according to the vehicle velocity, but may perform an operation using the yaw rate value of 0 at a predetermined vehicle velocity or less and the yaw rate value as it is at a predetermined vehicle velocity or more. Here, when the weight according to the vehicle velocity is applied, generally, as the vehicle velocity is increased, there is statistical data that reduces the size of signals (driving information) of the vehicle 200. Accordingly, as illustrated in FIG. 4A, a weight may be applied with reference to a weight table in an S form in which the weight is increased as the vehicle velocity is increased. Further, the index calculator 121 may limit a conversion rate according to a vehicle velocity when applying the weight according to the vehicle velocity to the input value input from the measurer 110 to be converted into an index signal representing driving aggressiveness.

The EWMA calculator 122 calculates an average value of an index signal applied in the index calculator 121, but calculates an average value of the index signal for a predetermined time window period. When the average value is calculated, the average value is calculated by applying a low weight to old data and applying a higher weight exponentially to the latest data to calculate the aggressiveness index.

The EWMA calculator 122 may be implemented as time windows having different sizes, respectively. For example, when ten EWMA calculators 122 are configured, the EWMA calculators 122 may be set as different time windows such that a time window of the first EWMA calculator 122 is 1 minute and a time window of the second EWMA calculator 122 is 2 minutes. That is, the EWMA calculator 122 may be represented by Equation similar to a low-pass filter, and may be expressed as the following Equation 7.

$$x_f(k+1) = \left(\frac{T}{T_s + T}\right)x_f(k) + \left(\frac{T_s}{T_s + T}\right)x_m(k+1) \quad \text{Equation 7}$$

$$\bar{x}_{k+1} = \alpha \bar{x}_k + (1-\alpha)x_{k+1}; \left(\alpha = \frac{T_s}{T_s + T}\right)$$

In Equation 7 above, a refers to a weight of 0 or more and 1 or less, k refers to a time index, T refers to a time constant (time window), and $T_s$ refers to a sampling time.

The EWMA calculator 122 which calculates the aggressiveness index by applying a low weight to old data and applying a high weight to the latest data to calculate an average value for a time window period may perform a real time operation unlike a simple moving average (SMA) calculating a data average for a time window period based on a time point of k+1 and may derive a result similar to SMA by adjusting a time constant T (time window) of Equation 7. SMA can also be measured in real time, however, unlike EWMA, SWMA is advantageous compared to SMA from a real-time calculation point of view since SMA stores all data during the set time window period in memory and calculates it.

As described above, the EWMA calculator 122 set as a time window having a different size calculates the aggressiveness index by calculating an average value of the index signal applied from the index calculator 121. However, the aggressiveness index calculated in the EWMA calculator 122 having a large time window may represent a long-term characteristic which is not changed well, that is, the nature of driver's driving habits, and when the aggressiveness index calculated in the EWMA calculator 122 having a small time window may represent a short-term characteristic which is frequently changed, that is, the nature of a driving intention of the driver. Therefore, it is preferred to set the size of the time window differently to calculate various aggressiveness indexes.

The weight-based DA index calculator 123 may calculate an average value of the aggressiveness indexes output from the plurality of EWMA calculators 122 to calculate a DA index for each measurement value corresponding to each input value.

The weight-based DA index calculator 123 may apply a weight to each aggressiveness index based on the calculated DA index in a previous step when calculating the DA index and then calculate an average value thereof to calculate the DA index for each measurement value corresponding to an input value.

The weight-based DA index calculator 123 according to one or more embodiments of the present disclosure applies a weight to the aggressiveness index based on the DA index calculated in the previous step to calculate a DA index for each measurement value. When the DA index calculated in the previous step belongs to a predetermined intermediate value, a weight of the aggressiveness index output from the EWMA calculator 122 having a small time window is increased and a weight of the aggressiveness index output from the EWMA calculator 122 having a large time window is decreased to calculate the DA index for each measurement value. When the DA index calculated in the previous step is beyond the predetermined intermediate value, the weight of the aggressiveness index output from the EWMA calculator 122 having a small time window is decreased and the weight of the aggressiveness index output from the EWMA calculator 122 having a large time window is increased to calculate the DA index for each measurement value.

When the previous DA index belongs to the intermediate value, that is, the driving aggressiveness is neutral, there is a need to calculate a high DA index or a low DA index by rapidly reflecting an intention of the driver to change a driving pattern, and there is a need to maintain the corresponding driving aggressiveness when the driver's DA index is high or low.

The EWMA calculator 122 having the large time window may represent long-term driving aggressiveness and the EWMA calculator 122 having the small time window may represent short-term driving aggressiveness. Accordingly, when the previous DA index belongs to the intermediate value, the DA index for each measurement value may be calculated by increasing a weight of the aggressiveness index output from the EWMA calculator 122 having the small time window (that is, the EWMA calculator 122 representing the short-term driving aggressiveness of the driver) and decreasing a weight of the aggressiveness index output from the EWMA calculator 122 having the large time window (that is, the EWMA calculator 122 representing the long-term driving aggressiveness of the driver) to rapidly reflect the driving intention or pattern of the driver and rapidly change the DA index.

On the contrary, when the previous DA index has the high value or the low value, the DA index for each measurement value may be calculated by decreasing the weight of the aggressiveness index output from the EWMA calculator 122 having the small time window (that is, the EWMA calculator 122 representing the short-term driving aggressiveness of the driver) and increasing the weight of the aggressiveness index output from the EWMA calculator 122 having the large time window (that is, the EWMA calculator 122 representing the long-term driving aggressiveness of the driver) to slowly change the DA index.

The intermediate value of the previous DA index is illustrative and may be set variously, such as a constant period, a value, etc., and may be set according to the entire scope of the calculated DA index.

Specifically, when the DA index calculated in the previous step belongs to an intermediate value (for example, may be set to 35 to 65, most preferably 50), the DA index may be calculated by increasing the weight of the aggressiveness index output from the EWMA calculator 122 having the small time window and decreasing the weight of the aggressiveness index output from the EWMA calculator 122 having the large time window.

In addition, when the DA index calculated in the previous step is beyond the intermediate value, the weight of the aggressiveness index output from the EWMA calculator 122 having the small time window is decreased and the weight of the aggressiveness index output from the EWMA calculator 122 having the large time window is increased to calculate the DA index.

Here, when the DA index calculated in the previous step is greatly beyond the intermediate value, the weight of the aggressiveness index output from the EWMA calculator 122 having the small time window may be smaller and the weight of the aggressiveness index output from the EWMA calculator 122 having the large time window may be larger.

For example, when the driver accelerates with a sporty driving intention by dynamically performing acceleration/deceleration or wheeling of the vehicle 200 in a driving intention aspect, the DA index is increased and as the degree is heavy, the DA index is maintained for a long time.

That is, as the DA index becomes both ends (0 or 100), the index is maintained for a long time.

The final DA index calculator 124 may calculate a DA index using the DA index for each measurement value calculated from the weight-based DA index calculator 123. The final DA index calculator 124 may also calculate a DA index using the input value input from the measurer 110 in addition to the DA index for each measurement value input from the weight-based DA index calculator 123. For example, when the measurer 110 detects a yaw rate sensor value, an accelerator position sensor value, a longitudinal/lateral acceleration sensor value, a steering angle sensor value, a wheel velocity sensor value, an IMU sensor value, and a curvature value, a curvature value is input to the final DA index calculator 124. By the remaining measurement values, a DA index for each measurement value may be calculated through the index calculator 121, the EWMA calculator 122, and the weight-based DA index calculator 123, and the final DA index calculator 124 may calculate a DA index using the curvature value and the DA index for each measurement value.

The final DA index calculator 124 may divide DA indexes for each measurement value or measurement values input from the measurer 110 into a longitudinal-related DA index, a lateral-related DA index, and longitudinal and lateral-related DA indexes related with both longitudinal and lateral directions.

The final DA index calculator 124 may calculate an average by applying a weight to each DA index for each measurement value according to the applied curvature value when the DA index is calculated using the average of each DA index for each measurement value.

Further, the final DA index calculator 124 of the torque vectoring control apparatus 100 according to one or more embodiments of the present disclosure may apply a weight based on at least one of a curvature value, longitudinal acceleration, and lateral acceleration to the DA index for each measurement value and calculate a DA index using the average of the DA index for each measurement value applied with the weight. That is, as described above, the DA index may be calculated higher than the case of generating only the longitudinal acceleration or the case of generating only the lateral acceleration when the longitudinal acceleration and the lateral acceleration are generated at the same time, and the weight applied with the DA index for each measurement value may be differently applied according to the longitudinal acceleration and the lateral acceleration.

When the applied curvature value is a predetermined value or less, the final DA index calculator 124 may calculate a final DA index by increasing a weight of a longitudinal-related DA index and decreasing weights of a lateral-related DA index and longitudinal and lateral-related DA indexes.

As such, the reason for calculating the DA index based on the curvature value applied by the final DA index calculator 124 is to calculate the DA index according to a driving situation.

Further, according to an aspect of the exemplary embodiment, the final DA index calculator 124 may apply a weight to the DA index for each measurement value based on the curvature value, calculate an average of the DA index for each measurement value applied with the weight, and also calculate a DA index by applying a weight according to longitudinal acceleration and lateral acceleration to the calculated average again. That is, when the longitudinal acceleration and the lateral acceleration are generated at the same time, in order to have a high DA index, by various methods, such as calculating the DA index such as a method of applying a weight or applying a reduced variable, the DA index may be high when the longitudinal acceleration and the lateral acceleration are generated at the same time. The method for having the high DA index when the longitudinal acceleration and the lateral acceleration are generated at the same time is not limited to the detailed description, and may also be applied with various steps and methods (e.g., adjusting a time window or adjusting a weight when the index signal is calculated, etc.).

Figure 9:
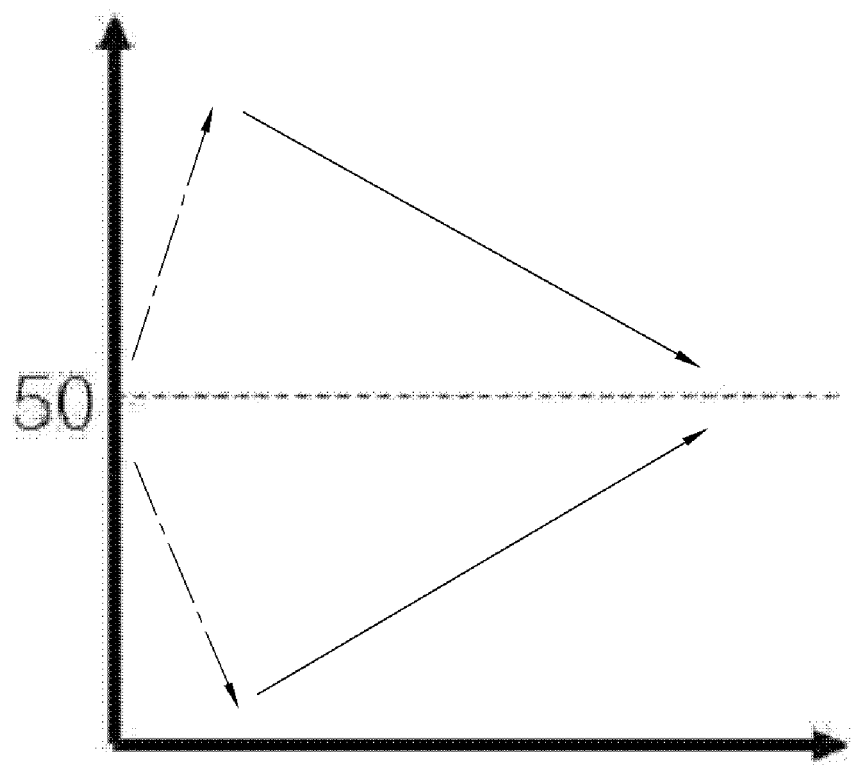
FIG. 9 is a diagram illustrating a driving aggressiveness index calculated according to a previous driving aggressiveness index according to one or more embodiments of the present disclosure.

FIG. 9 is a diagram illustrating a DA index calculated according to a previous DA index according to one or more embodiments of the present disclosure.

Referring to FIG. 9, in a graph shown in FIG. 9, when the DA index calculated in the previous step corresponds to an intermediate value and an intermediate region, a DA index in a next step may be rapidly changed. When a high DA index or a low DA index is calculated in the previous step, the DA index in the next step may be slowly changed, that is, the driving aggressiveness of the driver may be maintained.

That is, as described above, according to the previous DA index, when the DA index corresponds to the intermediate value, the DA index may be changed to reflect rapidly a driving intention of the driver, and when the previous DA index is high or low, a weight of the aggressiveness index output from the EWMA calculator 122 may be adjusted so that the DA index change is small.

As illustrated in FIG. 9, in a driving intention aspect of the driver, when the driver accelerates with a sporty driving intention, the DA index is increased, and as the degree is heavy, the DA index may be maintained for a long time. That is, in a graph shown in FIG. 9, it may be understood that the index may be maintained for a long time as the DA index becomes an end.

Figure 10:
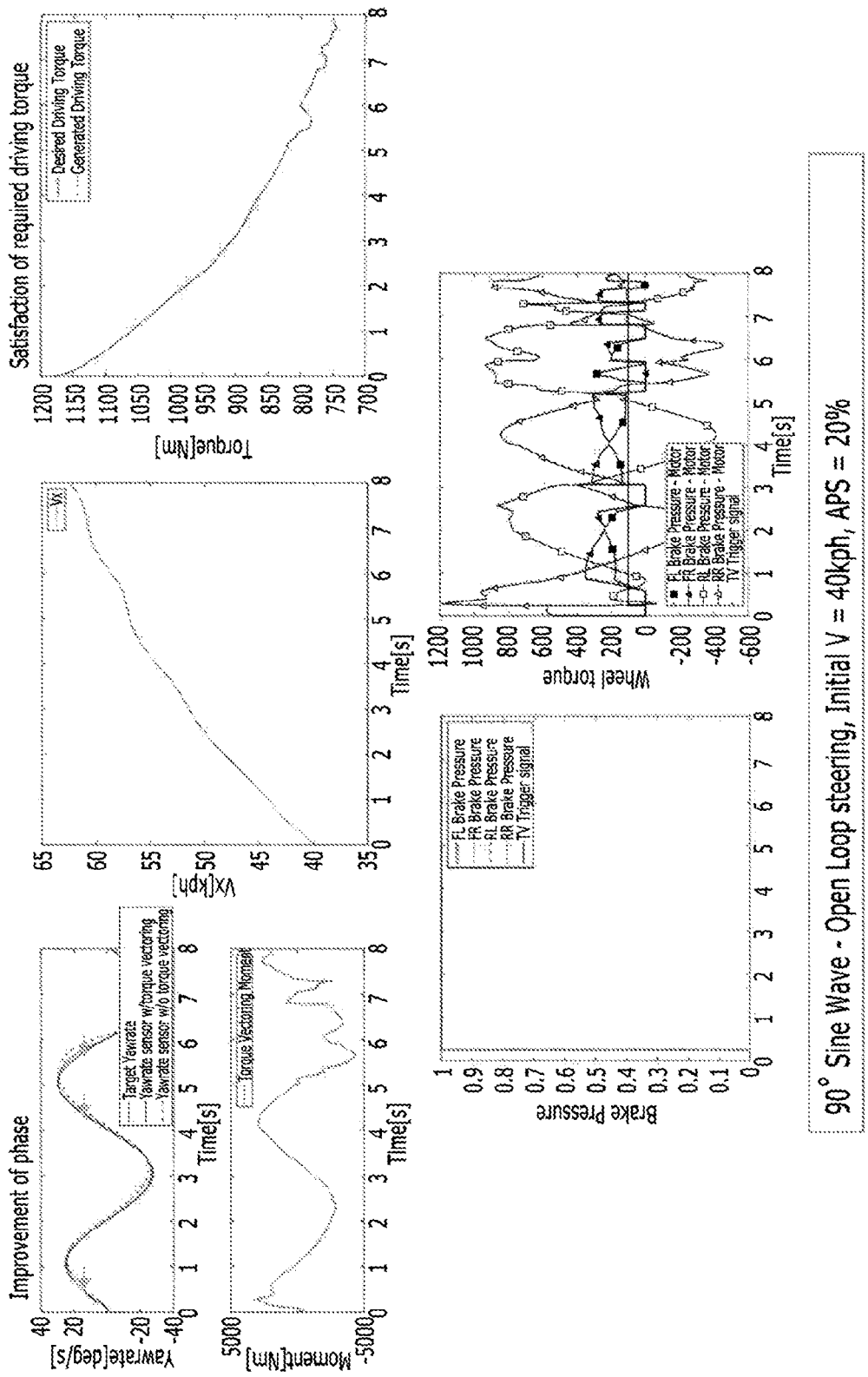
FIG. 10 is a diagram illustrating a test result using an apparatus for controlling torque vectoring according to one or more embodiments of the present disclosure.

FIG. 10 is a diagram illustrating a test result using a torque vectoring control apparatus (e.g., the torque vectoring control apparatus 100) according to one or more embodiments of the present disclosure.

FIG. 10 illustrates a result of testing when sine wave open loop steering is 90°, an initial velocity is 40 kph, and an accelerator position sensor (APS) is 20%. Referring to FIG. 10, it may be confirmed that a phase of a yaw rate has been improved while required driving torque is satisfied according to an acceleration/steering scenario.

Figure 11:
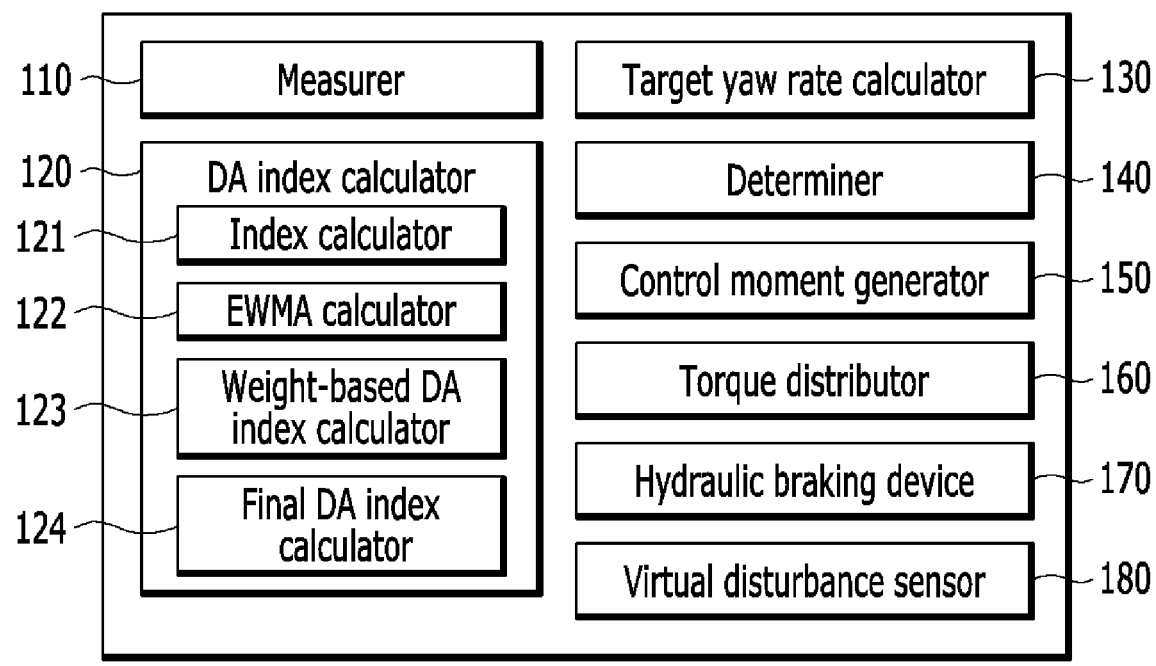
FIG. 11 is a schematic diagram of an apparatus for controlling torque vectoring according to one or more embodiments of the present disclosure.

FIG. 11 is a schematic diagram of a torque vectoring control apparatus (e.g., the torque vectoring control apparatus 100) according to one or more embodiments of the present disclosure.

Referring to FIG. 11, the torque vectoring control apparatus 100 according to one or more embodiments of the present disclosure may include a measurer 110, a DA index calculator 120, a target yaw rate calculator 130, a control trigger determiner 140, a control moment generator 150, a torque distributor 160, a hydraulic braking device 170, and a virtual disturbance sensor 180.

The measurer 110 may measure the driving information including the steering angle, the yaw rate, the longitudinal speed, the lateral acceleration, and the longitudinal acceleration of the vehicle 200. The measurer 110 may measure, sense, and receive driving information through various sensors provided in the vehicle 200.

The DA index calculator 120 may calculate a DA index representing driving aggressiveness through an EWMA method using the driving information. The DA index is used for determining a target yaw rate, a control moment, and an on/off condition (trigger) and controls torque vectoring so as to be suitable for a usual driving tendency or driving intention of the driver to distribute torque.

The DA index calculator 120 may include an index calculator 121, an EWMA calculator 122, a weight-based DA index calculator 123, and a final DA index calculator 124.

The index calculator 121 may apply a weight to each measurement value included in the driving information to calculate the applied weight as an index signal. The weight applied for calculating the index signal may be applied with reference to the weight table in the S form in which the weight is increased as the longitudinal velocity (vehicle velocity) of the vehicle 200 is increased.

The EWMA calculator 122 calculates an aggressiveness index using an average value of the index signal and is configured as different time windows to apply a weight according to a time window. That is, the DA index may be calculated by properly reflecting a driving intention of the driver by applying a larger weight to the latest data and applying a low weight to old data.

The weight-based DA index calculator 123 may calculate a DA index for each measurement value using an average value of the aggressiveness index and may differently apply a weight applied to the aggressiveness index output from the EWMA calculator 122 having the large time window and the EWMA calculator 122 having the small time window according to whether a value of the previous DA index corresponds to an intermediate value.

The final DA index calculator 124 may calculate a DA index using the DA index for each measurement value, apply a weight based on at least one of a curvature value, lateral acceleration, and longitudinal acceleration to the DA index for each measurement value, and calculate a DA index using the DA index for each measurement value applied with the weight. Accordingly, the DA index calculator 120 may calculate a high DA index when the longitudinal acceleration and the lateral acceleration are generated at the same time as described above.

The target yaw rate calculator 130 may calculate a target yaw rate based on the driving information and the DA index. The target yaw rate calculator 130 may calculate a target yaw rate based on a time constant and a yaw rate gain as variable factors based on the DA index, wherein the time constant may be inversely proportional to the size of the value of the DA index, and the yaw rate gain may be proportional to the size of the value of the DA index. Further, the yaw rate gain and the time constant may be calculated with reference to a weight table in an S form in which the weight is increased as the DA index is increased and a weight table in an S form in which the weight is increased as the DA index is decreased, respectively.

The control trigger determiner 140 may determine the understeering of the vehicle 200 and whether the moment is generated based on the driving information and the target yaw rate. That is, the control trigger determiner 140 may determine the on/off condition (trigger) for generating the control moment or distributing the control vectoring torque. Further, the control trigger determiner 140 may determine the understeering and whether the moment is generated based on the driving information, the target yaw rate, and the DA index to determine differently the on/off condition according to a driving tendency of the driver.

The control moment generator 150 may generate a control moment based on the driving information, the DA index, and the target yaw rate. Specifically, the control moment may vary according to a torque vectoring controller gain as a variable factor based on the DA index, and the torque vectoring controller gain may be calculated with reference to a weight table in an S form in which the weight is increased as the DA index is increased similarly to the yaw rate gain.

The torque distributor 160 may distribute braking torque and driving torque to a motor of each wheel of the vehicle 200 based on the control moment. The torque distributor 160 distributes the driving torque and the braking torque to a rear wheel motor (a motor provided in a rear wheel), but when the driving torque and the braking torque exceed maximum torque (motor output limit) of the rear wheel motor, some of the driving torque and the braking torque are distributed to a front wheel motor (a motor provided in a front wheel) to satisfy required driving torque. When the driving torque and the braking torque distributed to the front wheel motor exceed the maximum torque of the front wheel motor, in order to satisfy required driving torque, the hydraulic braking torque generated from the hydraulic braking device 170 is distributed to the front wheel motor and the rear wheel motor corresponding to the rotation direction to satisfy the required driving torque. At this time, the size of the hydraulic braking torque may be calculated based on a normal force. In addition, the hydraulic braking torque may be distributed with the same size or different sizes to the front wheel motor and the rear wheel motor corresponding to the rotational direction while satisfying the required driving torque.

The hydraulic braking device 170 is to generate and provide hydraulic braking torque when the driving torque or the braking torque to be distributed to the motor of each wheel exceeds maximum torque (motor output limit), and the generated hydraulic braking torque may be calculated based on a size of the driving torque or braking torque exceeding the maximum torque, a normal force, and the like.

The virtual disturbance sensor 180 may measure a disturbance changed over time, a disturbance such as a weight, may be changed temporarily, and the control moment generator 150 may generate a control moment in consideration of the disturbance to generate a control moment more suitable for driving control. In Equation 5, it may be confirmed that the control moment may be generated by considering a virtual disturbance $\hat{w}$. That is, the control moment generator may generate a control moment using a virtual disturbance (in other words, a disturbance measured in the virtual disturbance sensor 180).

Figure 12:
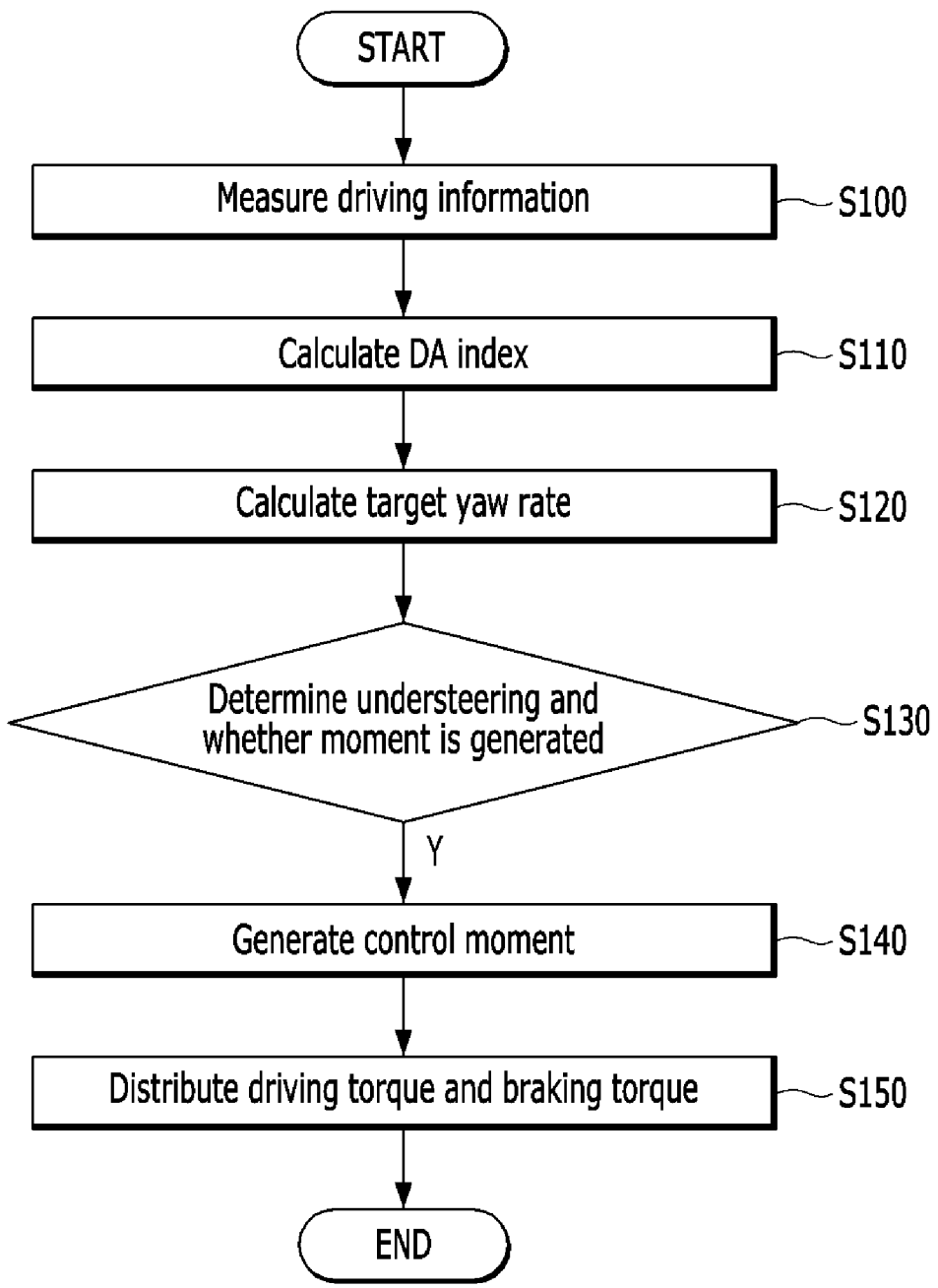
FIG. 12 is a diagram illustrating a method for controlling torque vectoring according to one or more embodiments of the present disclosure.

The method for controlling the torque vectoring illustrated in FIG. 12 may be performed by the torque vectoring control apparatus 100 described above. Accordingly, although omitted below, the contents described with respect to the torque vectoring control apparatus 100 may be applied in the same manner as the description of the method for controlling the torque vectoring.

FIG. 12 is a diagram illustrating a method for controlling torque vectoring according to one or more embodiments of the present disclosure.

In step S100, the measurer 110 measures the driving information from the vehicle 200. The driving information may include a steering angle, a yaw rate, a longitudinal velocity, lateral acceleration, longitudinal acceleration, and the like of the vehicle 200.

In step S110, the DA index calculator 120 may calculate a DA index. The DA index calculated in the DA index calculator 120 may be calculated by the EWMA method and calculated by applying a larger weight to the latest data and applying a low weight to old data. Further, the DA index may be calculated as an index signal by applying a weight according to a vehicle velocity (or a longitudinal velocity) of the vehicle 200 and applying a weight to each measurement value of the driving information measured with reference to the weight table in a S form in which the weight is increased as the vehicle velocity is increased. Further, a DA index for each measurement value may be calculated by varying a weight applied to an aggressiveness index according to a size of a time window of the EWMA calculator 122 according to the value of the previous DA index. Further, the DA index may also be calculated by varying the weight to the DA index for each measurement value according to a curvature value and may be calculated to have a high value when the longitudinal acceleration and the lateral acceleration are generated at the same time.

That is, the DA index may be calculated so that a different weight is applied based on various values such as a vehicle velocity, a previous DA index, a time window, a curvature value, longitudinal acceleration, and lateral acceleration, and as a result, the driving intention or the driving pattern of the driver may be reflected so suitably.

Next, in step S120, the target yaw rate calculator 130 may calculate a target yaw rate based on the driving information and the DA index. The value of the target yaw rate may vary according to a time constant and a yaw rate gain as variable factors based on the DA index. That is, the target yaw rate may vary according to the DA index and may be calculated by reflecting the driving aggressiveness of the driver.

Next, in step S130, the control trigger determiner 140 may determine understeering and whether a moment is generated based on the driving information and the target yaw rate. That is, the control trigger determiner 140 may determine an on/off condition (trigger) of the torque vectoring control and the on/off condition may be applied with a predetermined determination condition. Further, the control trigger determiner 140 may determine the understeering and whether the moment is generated by considering a DA index in addition to the driving information and the target yaw rate and may determine the understeering and whether the moment is generated to be suitable for the driving aggressiveness of the driver by considering the DA index, and present a clear on/off condition.

Next, in step S140, the control moment generator 150 may generate a control moment based on the driving information, the target yaw rate, and the DA index. The control moment may vary depending on the value of the torque vectoring controller gain, which is a variable factor based on the DA index. That is, the control moment generator 150 may generate a control moment by considering the DA index according to the driving aggressiveness of the driver to generate the control moment to be suitable for the driving intention or the driving pattern of the driver.

Next, in step S150, the torque distributor 160 may distribute driving torque and braking torque to a motor of each wheel of the vehicle 200 based on the control moment. The torque distributor 160 distributes the driving torque and the braking torque to each wheel of a rear wheel motor in response to a wheeling direction to generate a control moment while generating all driving forces intended by the driver, thereby preventing the deceleration while improving understeering (US). When the driving torque and the braking torque distributed to the rear wheel motor exceed maximum torque, the exceeded driving torque and braking torque may be distributed to the front wheel motor, respectively. When the driving torque and the braking torque distributed to the front wheel motor exceed maximum torque of the front wheel motor, a required moment (control moment) may be generated using hydraulic braking torque generated from the hydraulic braking device 170.

Figure 13:
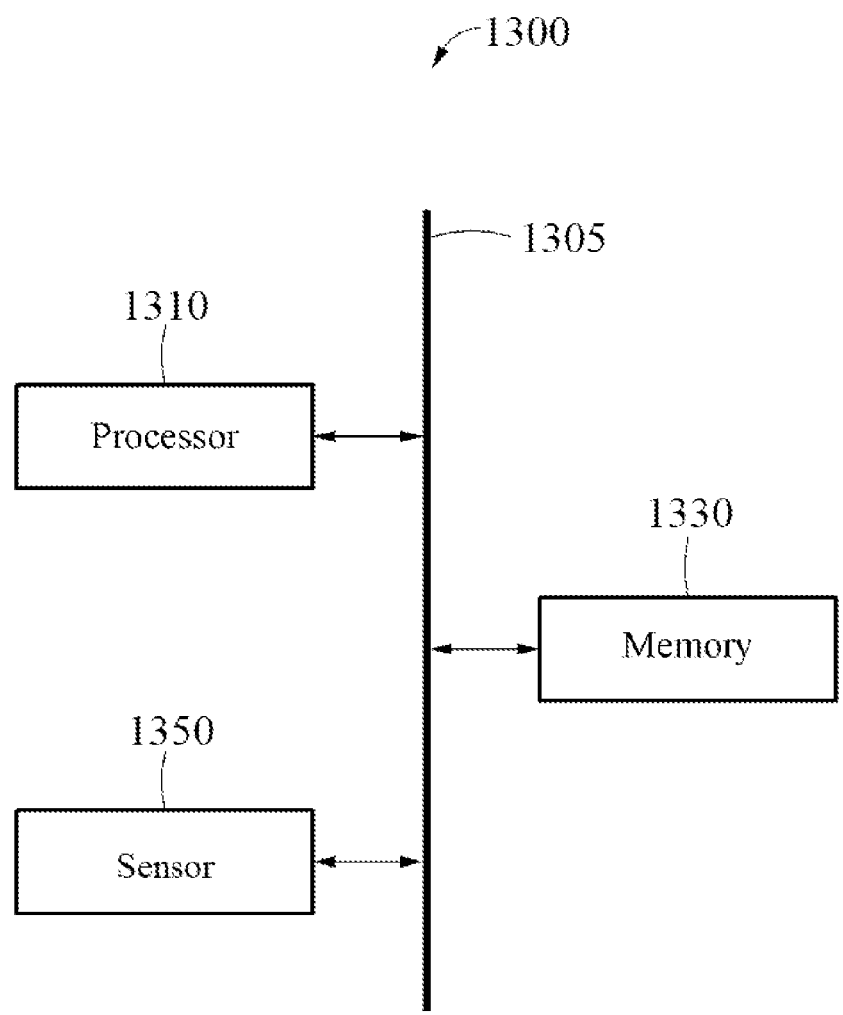
FIG. 13 illustrates an electronic apparatus according to one or more embodiments of the present disclosure.

FIG. 13 illustrates an electronic apparatus according to one or more embodiments of the present disclosure.

Referring to FIG. 13, an electronic apparatus 1300 may be or include a torque vectoring control apparatus described herein (for example, the torque vectoring control apparatus 100 of FIG. 1 and/or FIG. 11), as non-limiting examples. The electronic apparatus 1300 may be configured to perform one or more or all steps, operations, or methods described above with reference to FIGS. 1 through 12.

The electronic apparatus 1300 may be a computing device. The electronic apparatus 1300 may be, for example, a personal computer (PC), an advanced driver assistance system (ADAS), a head-up display (HUD) device, a camera, a 3D digital information display (DID), a navigation device, a neuromorphic device, a 3D mobile device, a smartphone, a smart television (TV), a smart vehicle, an internet of things (IoT) device, a medical device, or the like. The 3D mobile device may include, for example, a display device configured to display AR, virtual reality (VR), and/or mixed reality (MR), a head-mounted display (HMD), a face-mounted display (FMD), and AR glasses.

The electronic apparatus 1300 may include a processor 1310 (e.g., one or more processors), a memory 1330 (e.g., one or more memories), and a sensor 1350 (e.g., one or more sensors). These components of the electronic apparatus 1300 may communicate with one another through a communication bus 1305.

The processor 1310 may control an overall operation of the electronic apparatus 1300 and implement operations or methods by execution of instructions stored in the memory 1330. The processor 1310 may include the measurer 110, the DA index calculator 120, the target yaw rate calculator 130, the control trigger determiner 140, the control moment generator 150, and the differentiator 190 described above, as a non-limiting example. The processor 1310 may be configured to perform one or more or all steps, operations, or methods described above with reference to FIGS. 1 through 12. In an example, the processor 1310 may reconstruct an image by reflecting a compensation pattern in an acquired image.

The memory 1330 may store information used by the processor 1310 to perform operations. For example, the memory 1330 may store instructions, which when executed by the processor 1310, configure the processor to perform one or more or all steps, operations, or methods described above with reference to FIGS. 1 through 12, as well as related information for the execution of other functions or other applications of the electronic apparatus 1300. The memory 1330 may include, as a memory, an RAM, a DRAM, an SRAM, and other types of nonvolatile memory that are known in the related technical field. In addition, the memory 1330 may be a computer-readable storage medium or device, such as, for example, a storage, a magnetic hard disk, an optical disc, a flash memory device, and the like.

The sensor 1350 may include the virtual disturbance sensor 180 of FIG. 1 and/or FIG. 11, in an example.

The systems, torque vectoring control apparatuses, measurers, DA index calculators, EWMA calculators, weight-based DA index calculators, final DA index calculators, target yaw rate calculators, control trigger determiners, control moment generators, torque distributors, hydraulic braking devices, virtual disturbance sensors, differentiators, vehicles, system 10, torque vectoring control apparatus 100, measurer 110, DA index calculator 120, EWMA calculators 122, weight-based DA index calculator 123, final DA index calculator 124, target yaw rate calculator 130, control trigger determiner 140, control moment generator 150, torque distributor 160, hydraulic braking device 170, virtual disturbance sensor 180, differentiator 190, vehicle 200, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An apparatus with torque vectoring control of a vehicle with an independent driving motor, comprising: one or more processors configured to: measure driving information including a steering angle, a yaw rate, a longitudinal velocity, lateral acceleration and longitudinal acceleration of the vehicle; calculate a driving aggressiveness (DA) index representing driving aggressiveness of a driver through an exponential weighted moving average (EVW/MA) operation using the driving information; calculate a target yaw rate based on the driving information and the DA index; and generate a control moment based on the driving information, the DA index and the target yaw rate, wherein, for the calculating of the DA index, the one or more processor are configured to calculate the DA index to have a higher value than a case of generating only longitudinal acceleration or a case of generating only lateral acceleration, in response to the longitudinal acceleration and the lateral acceleration being generated at a same time to perform the torque vectoring control of the vehicle.

2. The apparatus of claim 1, wherein the one or more processors are configured to
  for the calculating of the target yaw rate, calculate the target yaw rate based on a time constant and a yaw rate gain as variable factors based on the DA index, and
  for the generating of the control moment, generate the control moment based on a torque vectoring controller gain as a variable factor based on the DA index.

3. The apparatus of claim 2, wherein the yaw rate gain and the torque vectoring controller gain are calculated using a weight table in an S form in which a weight is increased as the DA index is increased, and
  wherein the time constant is calculated using a weight table in the S form in which the weight is increased as the DA index is decreased.

4. The apparatus of claim 1, further comprising:
  a virtual disturbance sensor configured to measure a disturbance generated in the vehicle over time based on the steering angle, the yaw rate, the longitudinal velocity, and the lateral acceleration of the vehicle,
  wherein, for the generating of the control moment, the one or more processors are configured to generate the control moment based on the measured disturbance.

5. The apparatus of claim 1, further comprising:
  a torque distributor configured to distribute braking torque and driving torque to a motor of each wheel of the vehicle based on the control moment.

6. The apparatus of claim 5, wherein, for the distributing of the braking torque and the driving torque, the torque distributor is configured to
  distribute the driving torque and the braking torque to a rear wheel motor, and
  in response to the driving torque and the braking torque exceeding maximum torque of the rear wheel motor, distribute some of the driving torque and the braking torque to a front wheel motor.

7. The apparatus of claim 6, further comprising:
  a hydraulic braking device configured to generate hydraulic braking torque,
  wherein the torque distributor is configured to distribute the hydraulic braking torque to the front wheel motor and the rear wheel motor corresponding to a rotational direction of the vehicle, in response to the driving torque and the braking torque distributed to the front wheel motor exceeding maximum torque of the front wheel motor.

8. The apparatus of claim 1, wherein, for the calculating of the DA index, the one or more processors are configured to:
  apply a weight according to a vehicle velocity to each measurement value included in the driving information to convert the weight to an index signal representing driving aggressiveness, wherein the weight is applied using a weight table in an S form in which a weight is increased as the vehicle velocity is increased;
  using a plurality of EWMA calculators configured as time windows having different sizes, calculate an average value of an index signal to be for a predetermined time window period, and calculate a DA index by applying a higher weight to the latest data to calculate an average value;
  calculate a respective DA value for each measurement value corresponding to each measurement value by calculating an average value of the DA index; and
  calculate the DA index using the respective DA value for each measurement value.

9. The apparatus of claim 8, wherein for the calculating of the DA index, the one or more processors are configured to:
  apply a weight to the DA index based on the respective DA value calculated in a previous step to calculate the DA index for each measurement value,
  in response to the DA index calculated in the previous step belonging to a predetermined intermediate value, calculate the DA index for the each measurement value by increasing a first weight of the DA index output from an EWMA calculator having a small time window and decreasing a second weight of the DA index output from an EWMA calculator having a large time window, and
  in response to the DA index calculated in the previous step being beyond the predetermined intermediate value, calculate the DA index for the each measurement value by decreasing the first weight and increasing the second weight.

10. The apparatus of claim 1, wherein, for the generating of the control moment, the one or more processors are configured to:
  determine understeering of the vehicle and whether a moment is generated based on the driving information and the target yaw rate, and
  generate the control moment based on whether the moment is generated.

11. The apparatus of claim 10, wherein, for the determining of whether the moment is generated, the one or more processors are configured to determine whether the moment is generated according to a predetermined determination condition based on the driving information.

12. A processor-implemented method with torque vectoring control of a vehicle with an independent driving motor, comprising: measuring driving information including a steering angle, a yaw rate, a longitudinal velocity, lateral acceleration and longitudinal acceleration of the vehicle; calculating a DA index representing driving aggressiveness of a driver through an exponential weighted moving average (EVVMA) operation using the driving information; calculating a target yaw rate based on the driving information and the DA index; and generating a control moment based on the driving information, the DA index and the target yaw rate, wherein the calculating of the DA index comprises calculating the DA index to have a higher value than a case of generating only longitudinal acceleration or a case of generating only lateral acceleration, in response to the longitudinal acceleration and the lateral acceleration being generated at a same time to perform the torque vectoring control of the vehicle.

13. The method of claim 12, wherein the calculating of the target yaw rate comprises calculating the target yaw rate based on a time constant and a yaw rate gain as variable factors based on the DA index, and the generating of the control moment comprises generating the control moment based on a torque vectoring controller gain as a variable factor based on the DA index.

14. The method of claim 12, further comprising:

determining understeering of the vehicle and whether a moment is generated based on the driving information and the target yaw rate; and distributing braking torque and driving torque to a motor of each wheel of the vehicle based on the control moment, wherein the generating of the control moment comprises generating the control moment based on whether the moment is generated.

* * * * *